United States Patent
Du et al.

(10) Patent No.: US 12,119,999 B2
(45) Date of Patent: Oct. 15, 2024

(54) ROUTING PROTOCOL METHOD FOR UNDERWATER ACOUSTIC SENSOR NETWORKS BASED ON LAYERING AND SOURCE LOCATION PRIVACY

(71) Applicant: Qinghai Normal University, Xining (CN)

(72) Inventors: Xiujuan Du, Xining (CN); Xiaojing Tian, Xining (CN)

(73) Assignee: Qinghai Normal University, Xining (CN)

( * ) Notice: Subject to any disclaimer, the term of this patent is extended or adjusted under 35 U.S.C. 154(b) by 0 days.

(21) Appl. No.: 18/516,741

(22) Filed: Nov. 21, 2023

(65) Prior Publication Data

US 2024/0106716 A1   Mar. 28, 2024

(30) Foreign Application Priority Data

Mar. 20, 2023   (CN) .......................... 202310277073.4

(51) Int. Cl.
- *H04L 41/12* (2022.01)
- *H04B 13/00* (2006.01)
- *H04L 67/12* (2022.01)

(52) U.S. Cl.
CPC ............. *H04L 41/12* (2013.01); *H04B 13/00* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,600,830 | B2 * | 12/2013 | Hoffberg | G06Q 30/0282 705/14.71 |
| 9,054,978 | B2 * | 6/2015 | Shinohara | H04L 47/12 |
| 9,818,136 | B1 * | 11/2017 | Hoffberg | G07F 17/323 |
| 10,163,137 | B2 * | 12/2018 | Hoffberg | G06Q 30/0282 |

(Continued)

FOREIGN PATENT DOCUMENTS

| | | |
|---|---|---|
| CN | 107548029 A | 1/2018 |
| CN | 109660945 A | 4/2019 |

(Continued)

OTHER PUBLICATIONS

Tian, Xiaojing, et al. "LSLPR: A Layering and Source-Location-Privacy based Routing Protocol for Underwater Acoustic Sensor Networks." IEEE Sensors Journal (2023). (Year: 2023).*

*Primary Examiner* — Isam A Alsomiri
*Assistant Examiner* — Jonathan D Armstrong

(57) ABSTRACT

A routing protocol method for Underwater Acoustic Sensor Networks (UASNs) based on layering and source location privacy (SLP) is provided. (1) A proxy area is selected randomly by a source node. (2) A packet is delivered from the source node to the proxy area through a forwarding probability-based multipath routing algorithm, and a layer-based priority is given to candidate neighbor nodes to alleviate a long detour problem. (3) A proxy node in the proxy area is selected randomly. (4) The packet is delivered from the proxy node to a sink node through the forwarding probability-based multipath routing algorithm. (5) Steps (1) to (4) are repeated until the source node is changed or an adversary finds a position of the source node.

4 Claims, 24 Drawing Sheets

(56) References Cited

U.S. PATENT DOCUMENTS

| | | | |
|---|---|---|---|
| 10,943,273 B2* | 3/2021 | Hoffberg | G06Q 30/0207 |
| 11,790,413 B2* | 10/2023 | Hoffberg | G07F 17/323 |
| | | | 705/14.1 |
| 2010/0317420 A1* | 12/2010 | Hoffberg | G06Q 30/0282 |
| | | | 463/1 |
| 2011/0004513 A1* | 1/2011 | Hoffberg | G06Q 30/0282 |
| | | | 705/14.1 |
| 2014/0081793 A1* | 3/2014 | Hoffberg | G06Q 30/0207 |
| | | | 705/26.3 |
| 2018/0068358 A1* | 3/2018 | Hoffberg | G06Q 30/0207 |
| 2021/0192582 A1* | 6/2021 | Hoffberg | G07F 17/3237 |

FOREIGN PATENT DOCUMENTS

| | | | |
|---|---|---|---|
| CN | 110493841 A | 11/2019 | |
| CN | 111542059 A | 8/2020 | |
| CN | 112689282 A | 4/2021 | |
| WO | 2019169874 A1 | 9/2019 | |

\* cited by examiner

ROUTING PROTOCOL METHOD FOR UNDERWATER ACOUSTIC SENSOR NETWORKS BASED ON LAYERING AND SOURCE LOCATION PRIVACY

CROSS-REFERENCE TO RELATED APPLICATIONS

This application claims the benefit of priority from Chinese Patent Application No. 202310277073.4, filed on Mar. 20, 2023. The content of the aforementioned application, including any intervening amendments thereto, is incorporated herein by reference in its entirety.

TECHNICAL FIELD

This application relates to wireless sensor networks, and more particularly to a routing protocol method for underwater acoustic sensor networks (UASNs) based on layering and source location privacy.

BACKGROUND

In recent years, extensive researches have been conducted on Source Location Privacy (SLP) in Wireless Sensor Networks (WSNs), while the research about SLP in Underwater Acoustic Sensor Networks (UASNs) is still at a primary stage. SLP is of great significance in the fields of underwater resource exploration and underwater battlefield monitoring.

The increasing global attention to the oceans has greatly promoted the development of UASNs. However, the accompanying security issues have become increasingly prominent, and the privacy security of UASNs needs to be addressed. Most of the current security researches about UASNs only focus on active attacks, while passive attacks are often ignored. However, the abnormal energy consumption or the alteration in packet content caused by active attacks makes it easy for nodes to detect and sense the attack; whereas passive attacks usually employ eavesdropping attacks and backtracking attacks, which will not result in a change in the packet content such that it is difficult to detect such attacks. Inspired by this, the concept of SLP in WSNs is introduced into UASNs. A SLP-based routing protocol specialized for UASNs is designed to mainly solve the security problems caused by passive attacks. SLP is crucial in the UASNs, and there is no routing protocol designed for source node location privacy protection in the UASNs.

SUMMARY

In view of the deficiencies in the prior art, this application provides a routing protocol method for Underwater Acoustic Sensor Networks (UASNs) based on layering and source location privacy, which can assign different priorities to different nodes to alleviate the long detour problem, and has a longer security period, shorter latency, and less energy consumption.

In a first aspect, this application provides a routing protocol method for underwater acoustic sensor networks (UASNs) based on layering and source location privacy (LSLP), comprising:

(1) selecting randomly a proxy area by a source node;
(2) delivering a packet from the source node to the proxy node through a forwarding probability-based multipath routing algorithm; and giving a layer-based priority to candidate neighbor nodes to alleviate a long detour problem;
(3) selecting randomly a proxy node in the proxy area;
(4) delivering the packet from the proxy node to a sink node through the forwarding probability-based multipath routing algorithm; and
(5) repeating steps (1)-(4) until the source node is changed or a position of the source node is found by an adversary;

wherein the step of "selecting randomly the proxy node" comprises:

(a) establishing a three-dimensional (3D) coordinate system with the sink node as a center node; making position information of the sink node public across a network; and dividing a 3D underwater space into four quadrants based on the 3D coordinate system;
(b) converting position information of an underwater node into a 3D coordinate centered on the sink node during a network initialization process;
(c) assuming that a layer of the source node is $L_s$, such that a layer of the proxy area is expressed as:

$$L_p = \text{INT}(L_s/2) \qquad (1);$$

wherein $L_p$ is the layer of the proxy area; and the proxy area contains all nodes in the layer $L_p$;
(d) dividing the proxy area into a first subarea, a second subarea, a third subarea, and a fourth subarea by the 3D coordinate system;

wherein if the source node is in one of the four quadrants, proxy areas in the other three of the four quadrants become candidate proxy areas; and a random number Q is set in a range from 0 to 3, and a target proxy area is selected according to a value of the random number Q; and (e) after the packet is delivered from the source node to a first node in the proxy area, randomly selecting the number of hops of the packet in the proxy area based on the random number Q, wherein a node reached by a last hop is the proxy node.

In an embodiment, the forwarding probability-based multipath routing algorithm is performed through steps of:

selecting, by a sending node, neighbor nodes whose layers are not greater than a layer of the sending node as the candidate neighbor nodes; and selecting, by the sending node, a best next hop by calculating a forwarding probability of the candidate neighbor nodes; wherein the forwarding probability depends on a node density and a residual energy of the candidate neighbor node;

a forwarding probability $P(i,j)$ of a candidate neighbor node j of a sending node i is expressed as:

$$P(i,j) = \alpha e(j) + \beta d(j) \qquad (2);$$

wherein $\alpha$ and $\beta$ are weight coefficients, and $\alpha+\beta=1$; $d(j)$ represents a node density of the candidate neighbor node j; $e(j)$ represents a ratio of a residual energy $E_R(j)$ of the candidate neighbor node j to an initial energy $E_{init}$ of the candidate neighbor node j, and is expressed as:

$$e(j) = \frac{E_R(j)}{E_{init}}; \qquad (3)$$

the node density of the candidate neighbor node j is expressed as:

$$d(j) = \frac{|Nc(j)|}{\sum_{x=0}^{|Nc(i)|} |Nc(x)|};\quad (4)$$

wherein Nc(j) represents a set of candidate nodes of the candidate node j; |Nc(j)| represents the number of the candidate nodes of the candidate node j; and $$\sum_{x=0}^{|Nc(i)|} |Nc(x)|$$

represents the number of candidate neighbor nodes of all candidate neighbor nodes of the sending node i.

In an embodiment, the step (2) further comprises:
screening a candidate neighbor node of a sending node that is close to the proxy area through the following steps:
(A) setting a coordinate of a sending node A as $(x_s, y_s, z_s)$; selecting a coordinate of a sphere center O as (a, b, c); wherein the sphere center O is a coordinate point of the sending node A closest to a quadrant in which the proxy area is located;
(B) calculating a sphere radius R; wherein the sphere radius R is a maximum of a distance $R_{min}$ and a communication radius $R_c$; and the distance $R_{min}$ represents a distance between the sending node A and the sphere center O, expressed as:

$$R_{min} = \text{sqrt}((a-x_s)^2 + (b-y_s)^2 + (c-z_s)^2) \quad (5);$$

the sphere radius R is expressed as:

$$R = \max(R_{min}, R_c) \quad (6);$$

(C) screening the candidate neighbor node close to the proxy area; assuming that a set of the candidate neighbor node close to the proxy area is V, the sending node A has i candidate neighbor nodes, and coordinates of the i candidate neighbor nodes are expressed as $(x_i, y_i, z_i)$; wherein a node whose distance from the sphere center O is less than or equal to the sphere radius R is the candidate neighbor node of the sending node A close to the proxy area; and the set V is expressed as:

$$V = \{(x_i, y_i, z_i) | \text{sqrt}((a-x_i)^2 + (b-y_i)^2 + (c-z_i)^2) <= R\} \quad (7).$$

In an embodiment, in step (2), the layer-based priority comprises:
Priority 1: the sending node preferentially selects the candidate neighbor node that is close to the proxy area; and
Priority 2: compared to a layer of the sending node, the candidate neighbor node with a smaller layer is preferentially selected;
wherein the sending node first selects candidate neighbor nodes that satisfy the priority 1, finds candidate neighbor nodes that satisfy the priority 2 from the candidate neighbor nodes that satisfy the priority 1, and selects a node with the highest forwarding probability from the candidate neighbor nodes that satisfy both the priority 1 and the priority 2 as a best next hop according to the forwarding probability-based multipath routing algorithm.

This application has the following beneficial effects.
1. This application proposes a proxy node selection scheme that does not require the source node to know the location information of the proxy node in advance.
2. This application proposes a Multi-Path Routing algorithm based on Forwarding Probability (MPR-FP) which is more applicable to three-dimensional UASNs.
3. This application proposes a layered and SLP-based Routing (LSLPR) protocol for UASNs. The LSLPR protocol uses random proxy nodes and MPR-FP algorithm to create multi-path routes, and the multiple paths are distributed in various regions of the network. Therefore, the security period of LSLPR protocol is greatly extended.
4. The long detour problem is alleviated by giving different priorities to the candidate nodes during the first phase of packet delivery.
5. Each node has layered information, and the routing algorithm considers summing node density, which solves the problem of empty regions. Also, by achieving energy balance, empty regions are prevented due to premature death of nodes.

DETAILED DESCRIPTION OF EMBODIMENTS

To further understand the present disclosure, the present disclosure is described in detail in connection with the accompanying drawings and embodiments. The embodiments are merely explanatory and does not limit the present disclosure.

Figure 1:
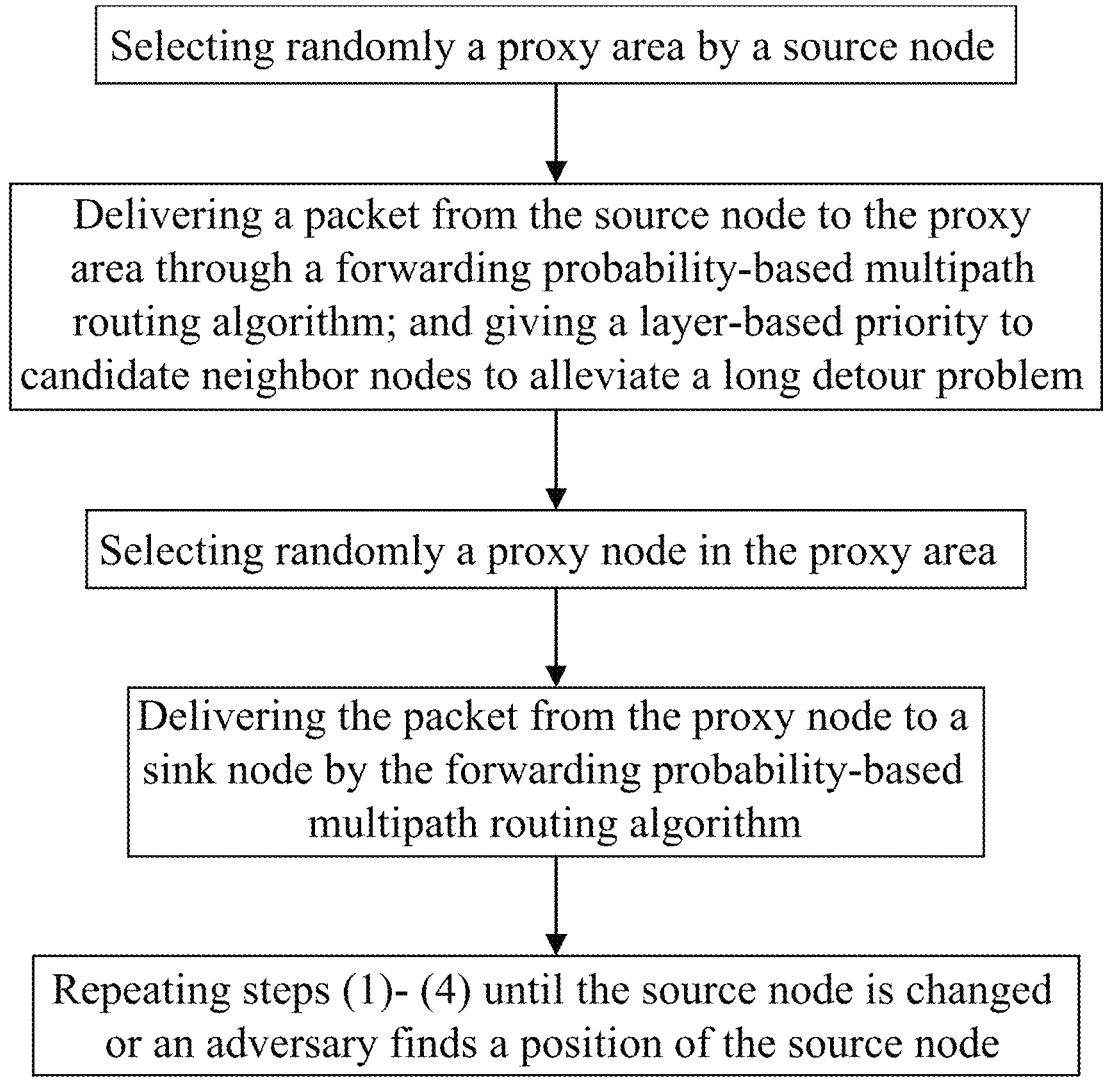
FIG. 1 is a flowchart of a routing protocol method for Underwater Acoustic Sensor Networks based on layering and source location privacy according to one embodiment of the present disclosure.

As shown in FIG. 1, this embodiment provides a routing protocol method for Underwater Acoustic Sensor Networks (UASNs) based on layering and source location privacy (LSLP), including:

(1) Initializing the UASNs; and obtaining information of the layer and neighbor-table including two-hops neighbors for each node;

(2) selecting randomly a proxy area by a source node;

(3) delivering a packet from the source node to the proxy area through a forwarding probability-based multipath routing algorithm; and giving a layer-based priority to candidate neighbor nodes to alleviate a long detour problem;

(4) selecting randomly a proxy node in the proxy area;

(5) delivering the packet from the proxy node to a sink node through the forwarding probability-based multipath routing algorithm; and (6) repeating steps (1)-(5) until the source node is changed or a position of the source node is found by an adversary.

1. System Model and Assumption

1.1 Network Model

The network model in this embodiment is a combination of a 3D Underwater Acoustic Sensor network model and a panda-hunter model, consisting of sink nodes on the water surface, and sensor nodes randomly deployed in the 3D network. The sensor nodes under the water surface sense the data and transmit the data to the sink nodes through a multi-hop approach. Ordinary sensor nodes are used to relay the packets. The hunter is near the sink node, and the area where the panda is located is near the source node. When the source nodes change, the area where panda is located also changes.

1.2 Adversary Model

Assuming that there is only one adversary in the network, the adversary covets the value of the source node and tries its best to find the position of the source node. In this process, the source node continuously sends packets to the sink node. The adversary starts searching for the position of the source node from sink. In order not to be detected by the network administrator, passive attacks like eavesdropping attack and backtracking attack are used. Based on the result of the eavesdropping results, the adversary moves directly to the next node. In other words, the adversary waits at a node until the packet is intercepted, and moves to the sending node of the packet, and the process is repeated until the adversary finds the source node.

1.3 Assumption

1) Except for the sink node, the other sensor nodes have the same functionality and parameters (e.g., initial energy, listening range, fixed transmit power, and gain).

2) All the sensor nodes are randomly and uniformly deployed in a three-dimensional area of defined range.

3) The initial energy of the adversary is infinite.

4) Except for the available energy, the adversary has the same attributes as the underwater sensor nodes, such as listening range and transmit power, both the adversary only can attack locally, not globally.

5) The packets transmitted in the network are encrypted and cannot be cracked by the adversary.

2. LSLPR Protocol

2.1 Acquisition of Layer

In UASNs, the underwater nodes move with the water flow, in order to obtain the layer information and neighbor information of the underwater nodes in real time, sink periodically broadcasts hello packets to the network. The layer of the underwater node is the minimum number of hops that the underwater node is away from the sink node. When the underwater node listens to the hello packet, the information of the sending node of the hello packet is added to the two-hop neighbor table of the underwater node. The algorithm to get the layer information and neighbor information of the underwater node is in Algorithm 1.

Algorithm 1

```
sink_layer="0"
current_node_layer="255"
sink broadcasts the hello packet to the network
when the node receives the hello packet
if current_node_layer="255"
    current_node_layer=sender_layer+1
    update the two hops neighbor table
  update the hello packet
    the sender_layer is updated to current_node_layer, the sender is updated to
current_node, and the one-hop neighbor information of current_node is carried.
    continue to broadcast the updated hello packet.
else
    if sender_layer >current_node_layer+1
      current_node_layer unchanged
    else
      current_node_layer= sender_layer +1
    end
    update the two hops neighbor table
update the hello packet
the sender_layer is updated to current_node_layer, the sender is updated to
current_node, and the one-hop neighbor information of current_node is carried.
    continue to broadcast the updated hello packet.
end
```

2.2 Selection Scheme of Proxy Node

Unlike the wireless sensor networks, the data of Underwater Acoustic Sensor network is always transmitted from bottom to top, so the layer of the proxy node should be smaller than that of the source node. In addition to this, since the underwater node moves with the water flow, the source node cannot determine the position information of all nodes in the network in real time to specify a specific proxy node. Finally, to improve the source location privacy, the proxy nodes should be randomly distributed in various regions of the network.

To address the above problems, we propose the following scheme for selecting proxy nodes randomly. The specific steps are as follows.

Figure 2:
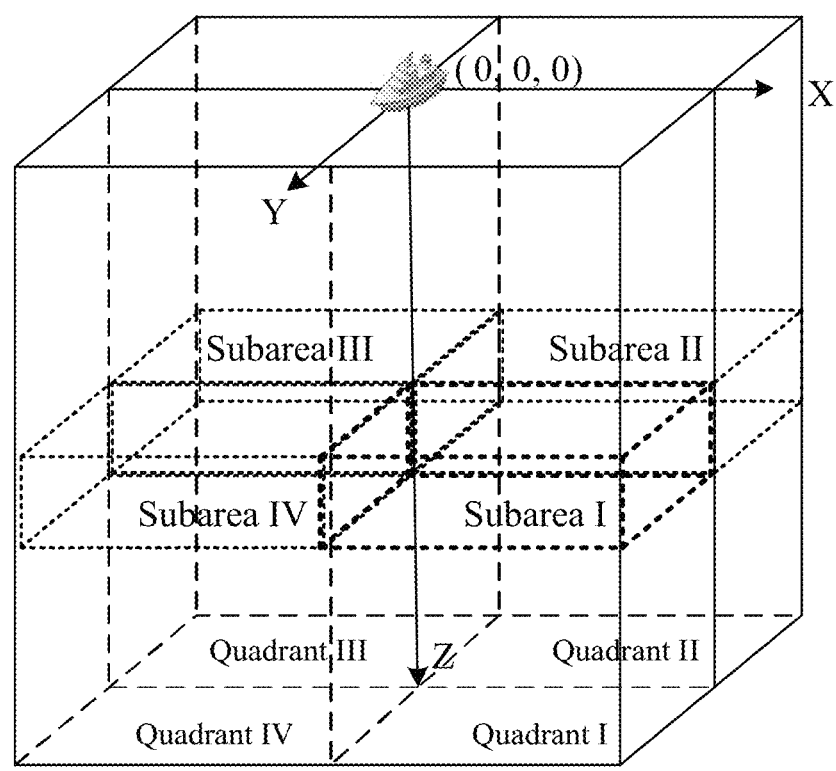
FIG. 2 is a schematic diagram of a three-dimensional (3D) coordinate system dividing a 3D underwater space into 4 quadrants according to one embodiment of the present disclosure.

(a) A three-dimensional (3D) coordinate system is established with the sink node as a center node. The position information of the sink node is made public across a network. The 3D underwater space is divided into four quadrants based on the 3D coordinate system, as shown in FIG. 2.

(b) The position information of the underwater node is converted into a 3D coordinate centered on the sink node during a network initialization process.

(c) It is assumed that the layer of the source node is $L_s$, such that the layer of the proxy area is expressed as:

$$L_p = \text{INT}(L_s/2) \quad (1);$$

where $L_p$ is the layer of the proxy area; and the proxy area contains all nodes in the layer $L_p$.

(d) The proxy area is divided into the subarea I, the subarea II, the subarea III, and the subarea IV by the 3D coordinate system. If the source node is in one of the four quadrants, the proxy areas in the other three of the four quadrants become candidate proxy areas. One random number Q is set in a range of 0 to 3, and the target proxy area is selected according to a value of the random number Q, as shown in Table 1.

(e) After the packet is successfully delivered from the source node to the first node in the proxy area, according to the random number Q, the number of hops of the packet in the proxy area is randomly selected, and the node reached by the last hop is the proxy node.

TABLE 1

Selection of proxy area

| Proxy area Source region | Q | | |
|---|---|---|---|
| | [0, 1] | (1, 2] | (2, 3] |
| Quadrant I | Subarea II | Subarea III | Subarea IV |
| Quadrant II | Subarea I | Subarea III | Subarea IV |
| Quadrant III | Subarea I | Subarea II | Subarea IV |
| Quadrant IV | Subarea I | Subarea II | Subarea III |

2.3 Multipath Routing Algorithm Based on Forwarding Probability

In order to protect the SLP, the MPR-FP algorithm for UASNs is proposed. In this disclosure, SLP protection is realized in two phases. In the first phase, the source node routes the packets to the proxy node. In the second phase, the proxy node routes the packets to the sink node.

Both phases use the same routing algorithm to route the packets. In the routing algorithm, the sending node selects the neighbor nodes whose layers are not greater than the layer of the sending node as candidate neighbor nodes. The sending node selects the best next hop by calculating the forwarding probability of the candidate neighbor nodes. The forwarding probability depends on the node density and residual energy of the candidate neighbor node. The node density can alleviate the empty region problem. Meanwhile, the residual energy not only equalizes the energy in the network, but also enables multipath transmission of the packets from the source node to the sink node, thereby protecting the source location privacy. Therefore, the forwarding probability P(i,j) of one candidate neighbor node j of a sending node i is expressed as:

$$P(i,j) = \alpha e(j) + \beta d(j) \quad (2).$$

In the formula (2), $\alpha$ and $\beta$ are weight coefficients, and $\alpha + \beta = 1$; d(j) represents the node density of the candidate neighbor node j; e(j) represents the ratio of the residual energy $E_R(j)$ of the candidate neighbor node j to the initial energy $E_{init}$ of the candidate neighbor node j, and is expressed as:

$$e(j) = \frac{E_R(j)}{E_{init}}. \tag{3}$$

The node density of the candidate neighbor node j is expressed as:

$$d(j) = \frac{|Nc(j)|}{\sum_{x=0}^{|Nc(i)|} |Nc(x)|}. \tag{4}$$

In the formula (4), Nc(j) represents a set of candidate nodes of the candidate node j; |Nc(j)| represents the number of the candidate nodes of the candidate node j; and $$\sum_{x=0}^{|Nc(i)|} |Nc(x)|$$

represents the number of the candidate neighbor nodes of all candidate neighbor nodes of the sending node i.

Figure 3:
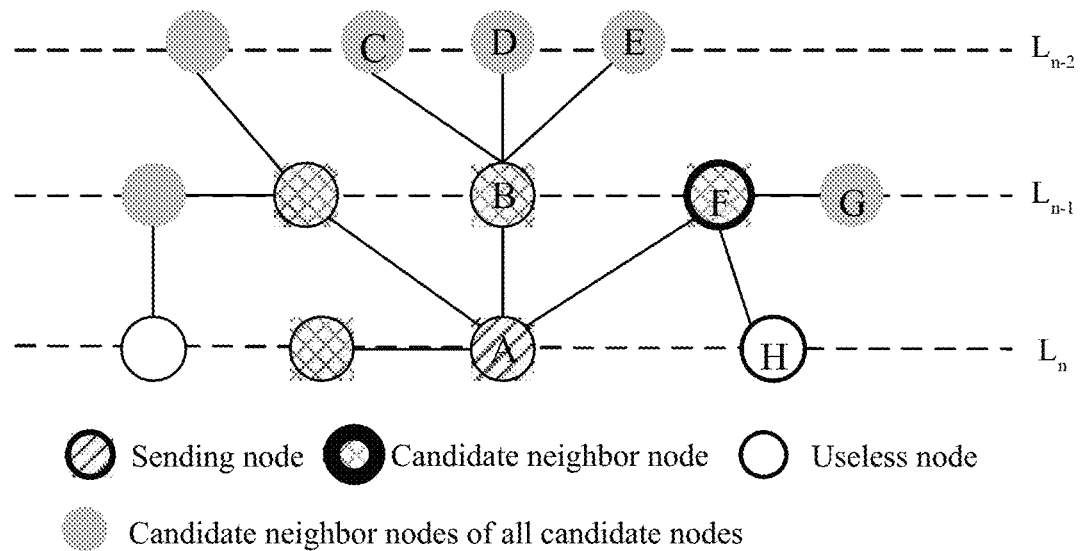
FIG. 3 is a schematic diagram of forwarding probability calculation according to one embodiment of the present disclosure.

FIG. 3 shows an example of calculating forwarding probability and highlights the calculating process of the node density. During the route selection process, the sending node A calculates the forwarding probability of all the candidate nodes, and the node with the highest forwarding probability is the best next hop node. Candidate nodes B and F are used as an example to show the calculation process of forwarding probability. The node density of the node B is the ratio of the number of candidate nodes of the node B (including nodes C, D, and E) to the total number of candidate nodes (all gray nodes) of all candidate nodes of the node A, namely 3/6. Similarly, the node density of the node F is 1/6. It is worth noting that although the node H is a neighbor node of the node F, the layer of the node H is larger than that of the node F, and in this routing process, the node H is a useless node. To summarize, if the residual energy of the node B is assumed to be the same as the residual energy of the node F, the forwarding probability of the node B will be greater than the forwarding probability of the node F. If the residual energies of the node B and the node F are different, the calculated node density and residual energy are introduced into formula (2) to obtain the final forwarding probability.

In LSLPR protocol, the selection of the proxy area as well as the proxy node is randomized. Secondly, since the residual energy is considered in selecting the next hop node during each packet transmission, even if the same proxy area is selected, different paths are taken from the source node to the proxy node. This makes the routing path more random, and it is difficult for an adversary to wait until the next packet arrives at a particular node, which in turn improves the privacy of the source location.

Figure 4:
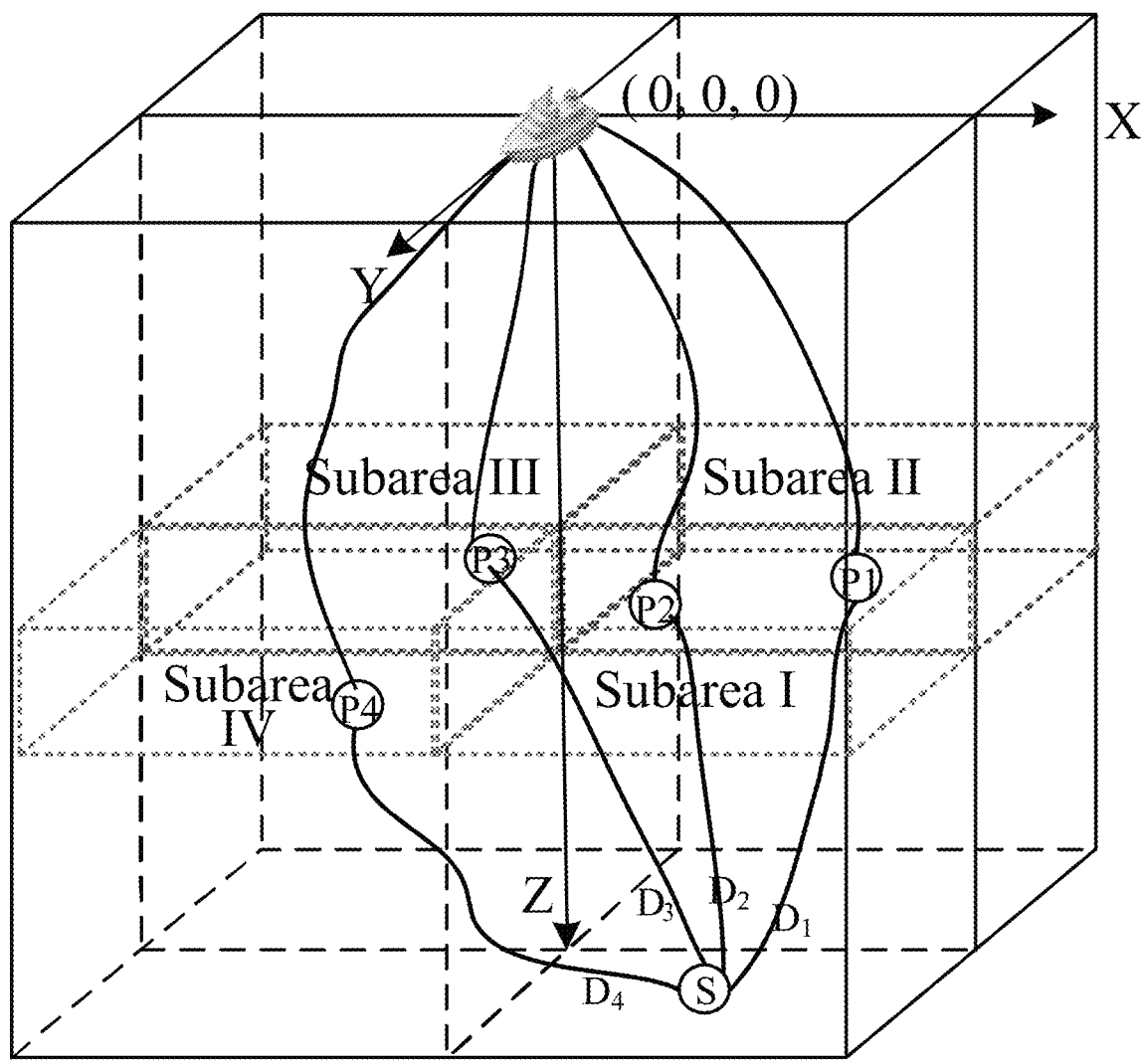
FIG. 4 is a schematic diagram showing that LSLPR protocol delivers packets via MPR-FP algorithm according to one embodiment of the present disclosure.

FIG. 4 is a schematic diagram showing that LSLPR protocol delivers packets through MPR-FP algorithm. In FIG. 4, the source node is in quadrant I and generates four consecutive packets. Packets D1 and D2 are transmitted to the sink node using different paths through proxy nodes P1 and P2 in subarea II, respectively. Packet D3 is transmitted to the sink node through proxy node P3 in subarea III. Packet D4 is transmitted to the sink node through proxy node P4 in subarea IV This allows consecutive packets generated by the same source node to reach the sink through different paths. Multiple paths are distributed in various regions of the network, to ensure SLP greatly.

2.4 Long Detour Problem

Most phantom routes as well as multipath routes have the long detour problem. Long detours can lead to severe delay and energy wastage, which is unacceptable for data transmission in UASNs. In this disclosure, no packets will be delivered in the opposite direction of the sink node, which has alleviated the long detour problem to some extent. However, as the sending node selects the best next hop based on the forwarding probability, the packets may be sent to other proxy areas in the first phase of the LSLPR protocol, resulting in long detours of the packets from the source node to the proxy node.

Based on the above-mentioned content, in the first phase of the routing process, the prioritization rule for nodes close to the proxy area is proposed to alleviate the long detour problem to some extent. The screening process of the candidate neighbor nodes of the sending node close to the proxy area is as follows.

(A) The coordinate of the sending node A is set as $(x_s, y_s, z_s)$. According to Table 2, the coordinate of the sphere center O is selecting as (a, b, c). The sphere center O is a coordinate point of the sending node A closest to the quadrant in which the proxy area is located.

(B) Calculation of the sphere radius R

The sphere radius R is the maximum of a distance $R_{min}$ and a communication radius Re. The distance $R_{min}$ represents a distance between the sending node A and the sphere center O, expressed as:

$$R_{min}=\text{sqrt}((a-x_s)^2+(b-y_s)^2+(c-z_s)^2) \tag{5}.$$

The sphere radius R is expressed as:

$$R=\max(R_{min}, R_c) \tag{6}.$$

(C) Screening the candidate neighbor node close to the proxy area

It is assumed that a set of the candidate neighbor nodes close to the proxy area is V. The sending node A has i candidate neighbor nodes. The coordinates of the i candidate neighbor nodes are expressed as $(x_i, y_i, z_i)$. Anode whose distance from the sphere center O is less than or equal to the sphere radius R is the candidate neighbor node of the sending node A close to the proxy area. The set V is expressed as:

$$V=\{(x_i, y_i, z_i) | \text{sqrt}((a-x_i)^2+(b-y_i)^2+(c-z_i)^2)<=R\} \tag{7}.$$

Figure 5:
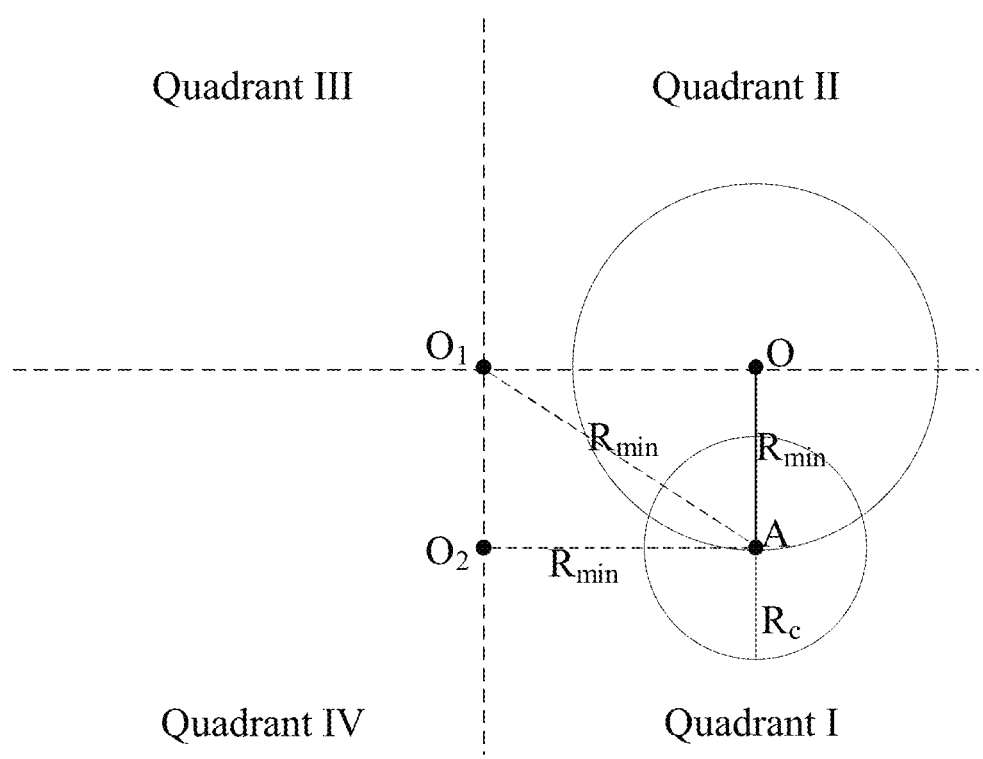
FIG. 5 is a schematic diagram of candidate neighbor nodes near a proxy area according to one embodiment of the present disclosure.

The set V is represented more visually in FIG. 5. Constructing one sphere with the sphere center (a, b, c) and of the sphere radius R, the sphere is the region that is closer to the proxy area for the sending node. Meanwhile, one sphere is constructed with $(x_s, y_s, z_s)$ as the sphere center and the radius $R_c$, which represents the transmission range of the sending node. The overlapped part of the two spheres is the candidate neighbor nodes of the sender that are close to the proxy area.

TABLE 2

Selection of sphere center

| area Sender quadrant | Proxy | | | |
|---|---|---|---|---|
| | Subarea I | Subarea II | Subarea III | Subarea IV |
| Quadrant I | | $(x_s, 0, z_s)$ | $(0, 0, z_s)$ | $(0, y_s, z_s)$ |
| Quadrant II | $(x_s, 0, z_s)$ | | $(0, y_s, z_s)$ | $(0, 0, z_s)$ |

TABLE 2-continued

Selection of sphere center

| area Sender quadrant | Proxy | | | |
|---|---|---|---|---|
| | Subarea I | Subarea II | Subarea III | Subarea IV |
| Quadrant III | (0, 0, $z_s$) | (0, $y_s$, $z_s$) | | ($x_s$, 0, $z_s$) |
| Quadrant IV | (0, $y_s$, $z_s$) | (0, 0, $z_s$) | ($x_s$, 0, $z_s$) | |

To summarize, the different priorities are given to the candidate nodes to avoid the long detour problem. The priorities are as follows.

Priority 1: The sending node gives preference to the candidate neighbor node which is close to the proxy area.

Priority 2: Compared to the layer level of the sending node, the candidate neighbor node with a smaller layer is preferentially selected.

In the first phase of routing, priority 1 and priority 2 are used. For the priority 2, if the layer level of the sending node is equal to the layer level of the proxy area during the first phase of routing, the candidate neighbor node that is in the same layer level as the proxy area is first selected. In the second phase of routing, only priority 2 is used. Specifically, the sending node first selects the candidate neighbor nodes that satisfy the priority 1, then finds the candidate neighbor nodes that satisfy the priority 2 from the candidate neighbor nodes that satisfy the priority 1. Finally, according to the MPR-FP algorithm, the candidate node with the highest forwarding probability from the candidate neighbor nodes that satisfy both the priority 1 and the priority 2 is selected as the best next hop. As a result, the packet will neither move away from the proxy area nor move in the opposite direction of the sink node. The above prioritization rule effectively avoids the long detour problem in LSLPR protocol.

2.5 Empty Region Problem

Figure 6:
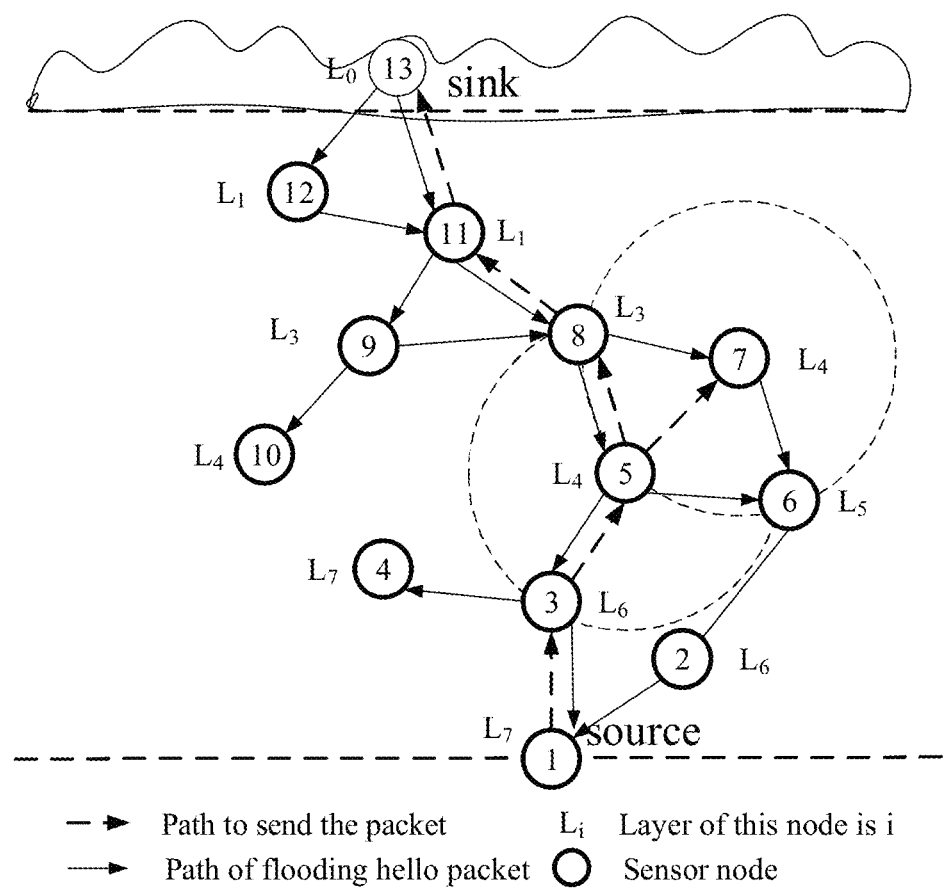
FIG. 6 is a schematic diagram showing empty zone wiring problem according to one embodiment of the present disclosure.

With many routing protocols in UASNs, empty regions are unavoidable when the packets are transmitted in a relatively sparse network. As shown in FIG. 6, when the packet arrives at the node 7, the node 7 cannot continue to deliver the packet to nodes closer to the sink node. An empty region is formed in the area above the node 7. There are two reasons for the empty region. The first reason is that energy imbalance causes premature death of some nodes. The second reason is that packets are routed to regions with low node density, making it impossible for the sending node to find the next hop close to the sink. Based on these reasons, this study uses the following solution to prevent the empty region problem.

First, the probability of a node with small remaining energy to become the next hop is small. Therefore, some nodes that die prematurely do not exist in this disclosure. By achieving energy balance, the creation of empty regions is avoided.

Secondly, each node has acquired its own layer level through sink node flooding hello packets, and at least one upper node should exist for each node. In addition, the MPR-FP algorithm considers the effect of node density, where candidate neighbor nodes with high node density are more likely to be selected as the next hop, avoiding packets being routed to regions with low node density. For example, the node 8 is more likely to be the next hop than the node 7. Therefore, there is no case where the sending node cannot find the next hop close to the sink.

In summary, the dual protection mechanism effectively solves the empty region routing problem. According to the MPR-FP algorithm, the path from the source node 1 to the sink node 13 is 1→3→5→8→11→13 if residual energy is not considered.

2.6 Source Location Privacy Analysis

In LSLPR protocol, randomized proxy nodes and MPR-FP algorithm are used to send packets from source node to sink node. In both shortest path routing and single path phantom routing, the shortest path routing is used to transmit the packets. The shortest path routing causes successive packets from the same source node to reach the sink node through closely connected intermediate nodes. Adversaries can easily receive consecutive packets, reducing the difficulty of tracing the source location. In addition, the shortest routing also reduces the time for the adversary to trace the source location. In LSLPR protocol, the source node sends packets to the proxy node using MPR-FP algorithm and the proxy node sends packets to the sink node using the same routing algorithm. The MPR-FP algorithm implements multipath routing, and the proxy node makes multiple paths randomly distributed in various regions of the network. In contrast to shortest path routing, the LSLPR protocol neither utilizes tightly connected intermediate nodes to deliver packets nor reduces the time for the adversary to trace the source location.

In the existing multipath routing protocols, different packets reach the sink node from the source node through multiple paths. The above protocol expands the search range of the adversary to some extent. However, in some cases, multiple paths are in parallel, which facilitates the adversary. Moreover, since the existence probability of multiple paths in the same region is very high, it is easy for the adversary to receive consecutive packets. As a result, the SLP level is reduced. In LSLPR protocol, proxy nodes make multiple paths distributed in different regions of the network. Proxy nodes with randomness and MPR-FP algorithm do not allow multiple parallel paths.

Overall, in LSLPR protocol, it is highly unlikely for an adversary to eavesdrop on consecutive packets. In order to successfully trace the source location, the adversary needs to intercept enough packets to trace the source location. However, it is possible that the source may change before the adversary obtains the source location. It is very difficult for the adversary to trace multiple paths scattered in the network. To summarize, the MRP-SLP protocol is effective against adversaries and protects SLPs.

3. Performance Analysis 3.1 Security Analysis

In this disclosure, the adversary cannot obtain the source location information by eavesdropping the contents of the packets. The adversary can only move towards the location of the source node by eavesdropping the packet. Location privacy is closely related to the location of the nodes in the network that the adversary has already obtained. For the adversary, the more uncertain nodes in the network, the better the SLP is protected. $A_T$ is the set of nodes for which the adversary has already obtained information about the nodes. $U_T$ represents all the nodes that the adversary cannot determine in the network, i.e., the set of protected nodes. Assuming that the $U_T$ contains n nodes, which can be expressed as $U_T = \{u_1, \ldots u_n\}$. The $U_T$ contains source nodes, and the set of nodes of the source nodes is $U_S$. The number of nodes in $U_T$ is proportional to the difficulty of tracking the source location. We use information entropy (hereafter referred to as "entropy") to measure the degree of privacy protection of the protocol. The entropy of location privacy is defined as:

$$S(p_1,p_2,p_3 \ldots p_n) = -\Sigma_{i=0}^{|U_T|} p_i \log_2(p_i) \qquad (8).$$

In the formula (8), $p_i$ represents the probability that the node i is a source node. $|U_T|$ is the number of nodes that the adversary cannot determine. The probability that any node in $U_T$ is the source node is $$\frac{|U_S|}{|U_T|}.$$

The number of uncertain nodes in the network for the adversary is n, i.e., $|U_T|=n$. The size of the node set of the source node is m, i.e., $|U_S|=m$. Therefore, the source location privacy is expressed as:

$$\begin{aligned} S(p_1, p_2, p_3 \ldots p_n) &= -\sum_{i=0}^{|U_T|} p_i \cdot \log_2(p_i) \\ &= -\sum_{i=0}^{|U_T|} \frac{|U_S|}{|U_T|} \cdot \log_2\left(\frac{|U_S|}{|U_T|}\right) \\ &= -\sum_{i=0}^{n} \frac{m}{n} \cdot \log_2\left(\frac{m}{n}\right) \\ &= -\sum_{i=0}^{n} \frac{m}{n} \cdot \log_2\left(\frac{n}{m}\right)^{-1} \\ &= m \cdot \log_2\left(\frac{n}{m}\right) \end{aligned} \qquad (9)$$

Entropy $S(p_1, p_2, p_3 \ldots p_n)$ describes the uncertainty of the adversary about the nodes in the network. When the adversary believes that all the nodes in the network have the same probability to become source nodes, the adversary's uncertainty about the nodes in the network is highest and the entropy reaches its maximum value. Therefore, we define the size of the total set $U_T^*$ of nodes in the network as N, i.e., $|U_T^*|=N$. Then, the optimal entropy is expressed as:

$$\begin{aligned} S(p_1, p_2, p_3 \ldots p_n) &= -\sum_{i=0}^{|U_T|} p_i \cdot \log_2(p_i) \\ &\leq -\sum_{i=0}^{|U_T^*|} p_i \cdot \log_2(p_i) \\ &= -\sum_{i=0}^{N} \frac{m}{N} \cdot \log_2\left(\frac{m}{N}\right) \\ &= m \cdot \log_2\left(\frac{N}{m}\right) \end{aligned} \qquad (10)$$

It is worth noting that the source location privacy is related to the size of $U_T$ and $U_S$. The larger $|U_T|$, the more nodes that may be the source node, the more uncertainty of the adversary about the source node, and the larger the entropy value. In this disclosure, it is almost impossible for the adversary to receive consecutive packets, and it is difficult for the adversary to obtain the location information of the nodes in the network by tracing the packets. It is difficult to further expand the content of the node set $A_T$, so the adversary has a great deal of uncertainty about the nodes in the network, which makes the privacy level of the source location of the routing protocol relatively high.

3.2 Network Lifetime

After we have protected the SLP, we are interested in balancing the energy consumption in the network to extend the network lifetime. The more nodes involved in transmission in the network, the more energy balance can be achieved, and the longer the network lifetime. We use the existing energy model. For an underwater acoustic signal with a frequency off, the signal attenuation in the underwater acoustic channel with the distance of dis expressed as:

$$A(d,f) = d^k \alpha(f)^d \qquad (11).$$

In the formula (11), d represents the distance between the sending node and the receiving node; f represents the frequency of the carrier wave in kHz; k is the energy diffusion coefficient (k=1 in cylinder, k=1.5 in real, k=2 in sphere). When f is kHz, $\alpha(f)$ represents the absorption coefficient in dB/km. The absorption coefficient is calculated using Throp formula, which is expressed as:

$$\alpha(f) = 0.11 \frac{f^2}{1+f^2} + 44 \frac{f^2}{4100+f^2} + 2.75 \cdot 10^{-4} f^2 + 0.003. \qquad (12)$$

The sending node transmits one packet of the length l bits to the receiving node, and the distance between the sending node and the receiving node is d. The energy consumption of the sending node to transmit the data is expressed as:

$$E_t(l,d) = lP_r T_d A(d,f) \qquad (13).$$

In the formula (13), $P_r$ represents the power consumption; $T_d$ represents the time of the data transmission. Meanwhile, the energy consumption of the receiving node to receive one packet is expressed as:

$$E_r(l) = lP_r T_d \qquad (14).$$

Assuming that the average number of hops of one packet from the source node to the sink node is H hops, the duration time of one hop for each packet transmission is $T_d$. After successfully transmitting w packets, the adversary finds the source location. The total energy consumption for transmitting packets in the network is expressed as:

$$\begin{aligned} E_{total} &= \sum_{i=1}^{\omega} H(E_t(l,d) + E_r(l)) \\ &= \omega H l P_r T_d (A(d,f)+1) \end{aligned} \qquad (15)$$

At this point, the more nodes in the network involved in packet forwarding, the less energy consumption of any node in the network in this stage of data transmission, and the longer the network life. Assuming that the probability of the node in the network to participate in data transmission is $\rho$, the average energy consumption of any one node in this phase of data transmission can be expressed as:

$$E_{single} = \frac{E_{total}}{|U_T| \cdot \rho}. \qquad (16)$$

According to the formula (16), the larger $\rho$, the smaller $E_{single}$. Specifically, the higher the probability that any node participates in data transmission, the smaller the average energy consumption of a single node. Because $|U_T|=n$ and $$S(p_1, \ldots p_n) = m \cdot \log_2\left(\frac{n}{m}\right),$$

so $n=2^{S(p_1,\ldots p_n)/m}\cdot m$. Therefore, $E_{single}$ can be expressed as:

$$E_{single} = \frac{E_{total}}{|U_T|\cdot \rho} \qquad (17)$$
$$= \frac{\omega HlP_r T_d(A(d,f)+1)}{n\cdot \rho}$$
$$= \frac{\omega HlP_r T_d(A(d,f)+1)}{2^{S(p_1,\ldots p_n)/m}\cdot m\cdot \rho}.$$

According to the formula (17), $E_{single}$ is inversely proportional to $S(p_1, \ldots p_n)$. The higher the privacy level, the lower the value of $E_{single}$, and the longer the network lifetime. In other words, in the LSLPR protocol, the protection of SLP and the extension of network lifetime can be realized simultaneously.

4. Simulation Evaluation

This section describes and analyzes the performance of LSLPR protocol. MATLAB simulation software is used to perform simulation experiments. In the simulation experiments, it is compared with SSLP, PP-SLPP, and 2hop-AHH-VBF. The SSLP and PP-SLPP are source location protection schemes UASNs that utilize AUVs to implement. 2hop-AHH-VBF is an energy efficient underwater routing protocol.

A. Performance Metrics

This section evaluates the following three performance metrics: security period, energy consumption, and delay. Security period is the distance traveled by the adversary to find the source node. Energy consumption is the total energy consumed for each simulation experiment run. The specific energy consumption calculation process is shown in formula (15). Delay is the end-to-end delay, i.e., the delay from the source node to the sink node. The simulation experiment parameters are shown in Table 3.

TABLE 3

Simulation experiment parameters

| Parameter | Value |
|---|---|
| Network sidelength | 800 m |
| Depth | 600 m-1000 m |
| Number of nodes | 500 |
| Topology | Random uniform deployment |
| Packet size | 1024 bits |
| Control packet size | 100 bits |
| Node initial energy | 10 J |
| Power consumption (Pr) | $10^{-5}$ W |
| Carrier frequency(f) | 20 kHz |

B. Security Period

Figure 7:
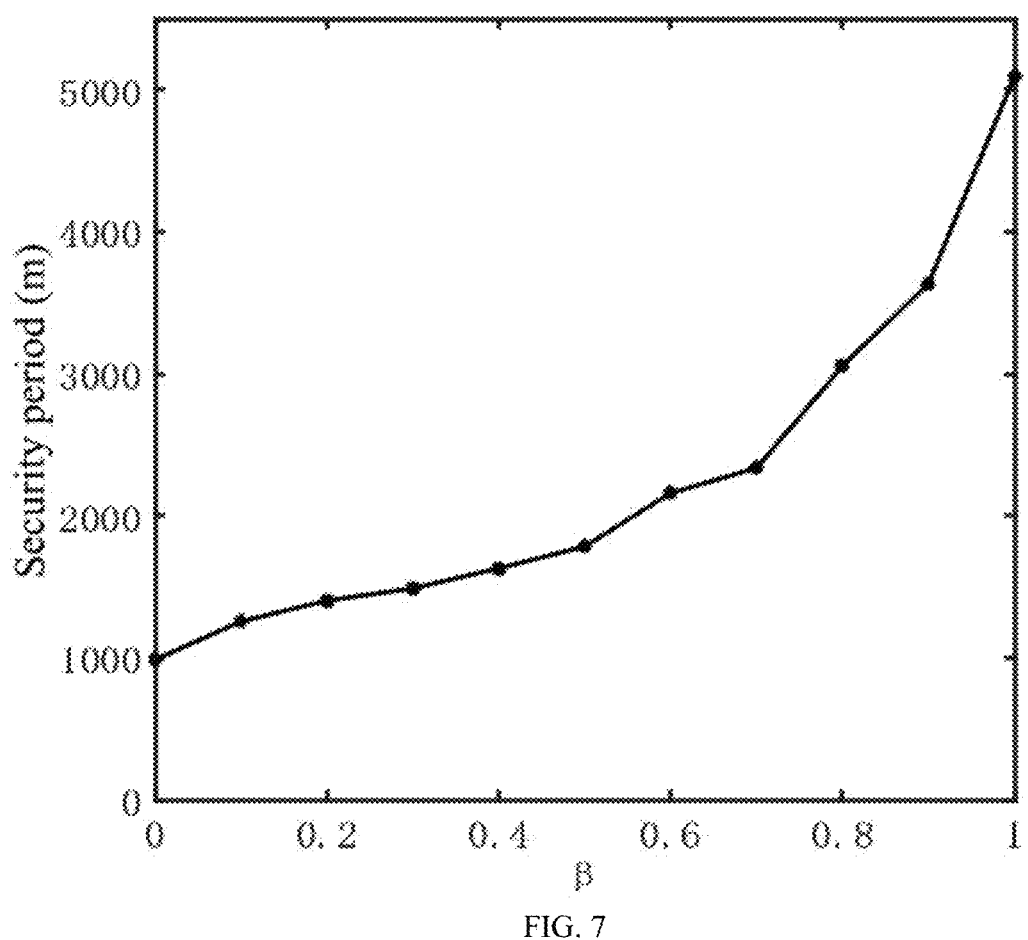
FIG. 7 is a schematic diagram of a security period of the MPR-FP algorithm in different β values according to one embodiment of the present disclosure.

According to the above definition of security period, the farther the adversary travels to find the source node, the more time the adversary spends to find the source node. The degree to which SLP is protected is determined by the length of the security period. FIG. 7 shows the security period of MPR-FP algorithm for different values of $\beta$. The larger the $\beta$ in MPR-FP algorithm, the greater the effect of residual energy on forwarding probability. As the effect of residual energy on forwarding probability increases, the diversity of routing path from the source node to the sink node increases. The diversity of routing paths makes it difficult for the adversary to find the source location. In FIG. 7, the security period of MPR-FP is increasing as the value of $\beta$ increases. $\beta$ value increases, and it becomes more difficult for the adversary to find the source location. In formula (2), both the effect of $\beta$ value on the security period and the effect of $\alpha$ value on the empty region routing problem are considered. After careful consideration, the value of $\beta$ is taken as 0.6 in this disclosure.

Figure 8A:
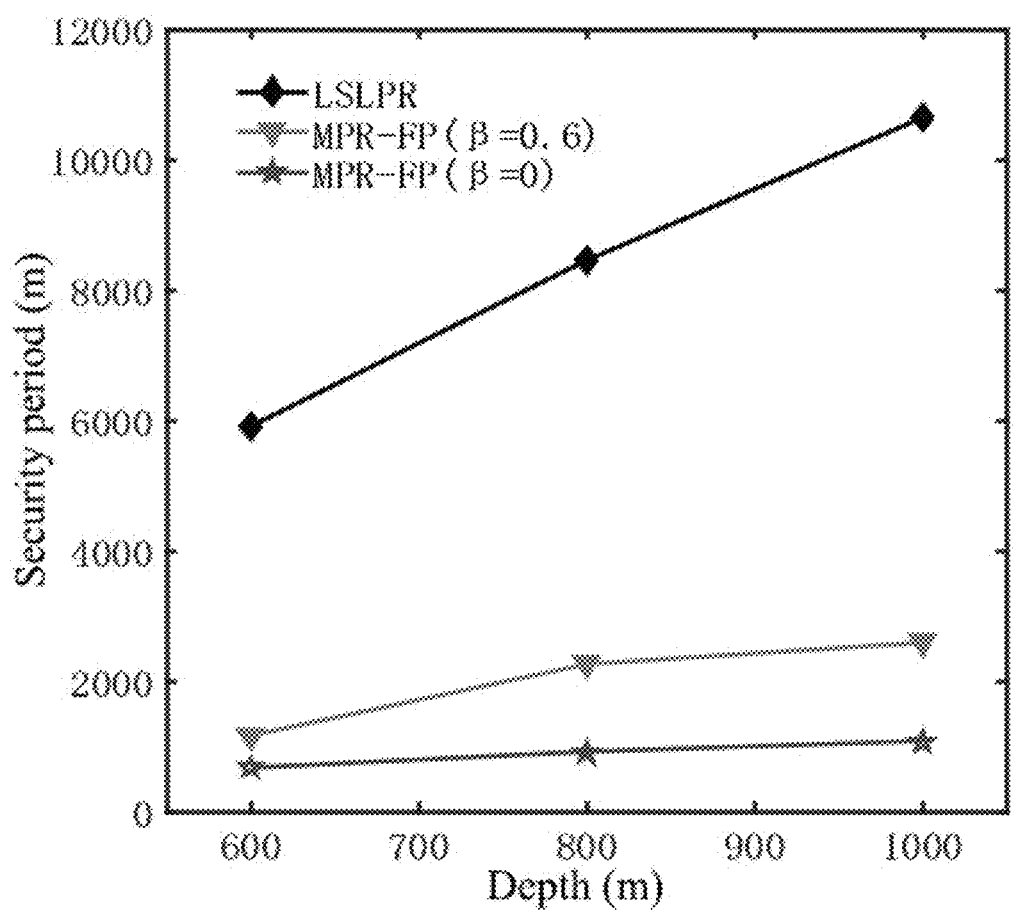
FIG. 8a is a relation diagram between the security period and a depth for MPR-FP (β=0), MPR-FP (β=0.6), and LSLPR according to one embodiment of the present disclosure.
Figure 8B:
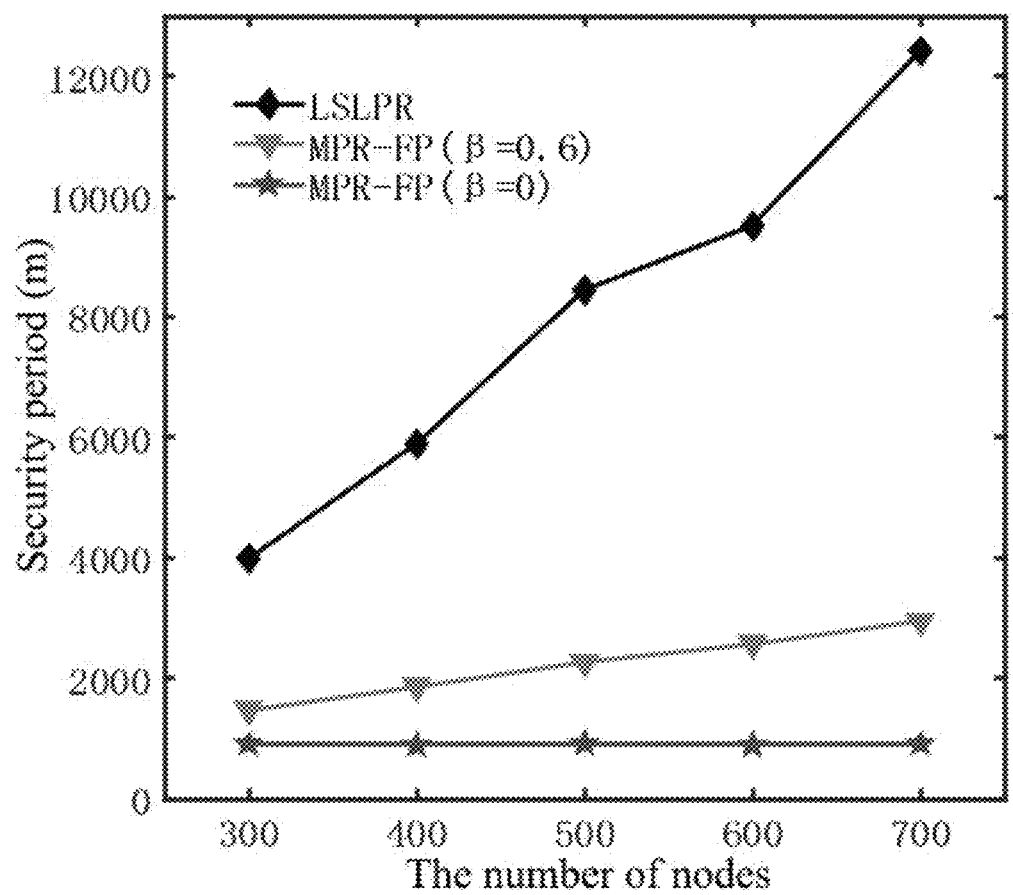
FIG. 8b is a relation diagram between the security period and number of nodes for MPR-FP (β=0), MPR-FP (β=0.6), and LSLPR according to one embodiment of the present disclosure.

FIGS. 8a and 8b demonstrate the comparative experiments of security period for MPR-FP ($\beta=0$), MPR-FP ($\beta=0.6$), and LSLPR. As shown in FIG. 8a, the security period monotonically increases with depth. When the depth increases, the distance between the adversary and the source node increases, and the security period also increases. FIG. 8b shows the trend of security period with increasing number of nodes. In MPR-FP ($\beta=0$), the residual energy does not affect the diversity of routing paths. Hence, there is only one routing path. Therefore, the increase in the number of nodes or the increase in the depth of nodes has less effect on the security period. In MPR-FP ($\beta=0.6$), the residual energy has a greater impact on the forwarding probability, making the routing paths more diverse. Therefore, the security period is higher in MPR-FP ($\beta=0.6$) than in MPR-FP ($\beta=0$). Multiple routing paths are present in LSLPR, and proxy nodes are added. Different packets generated by the source node reach the sink node through different paths distributed in the network, expanding the tracking range of the adversary. Therefore, the security period of LSLPR is the highest among the three schemes.

Figure 9A:
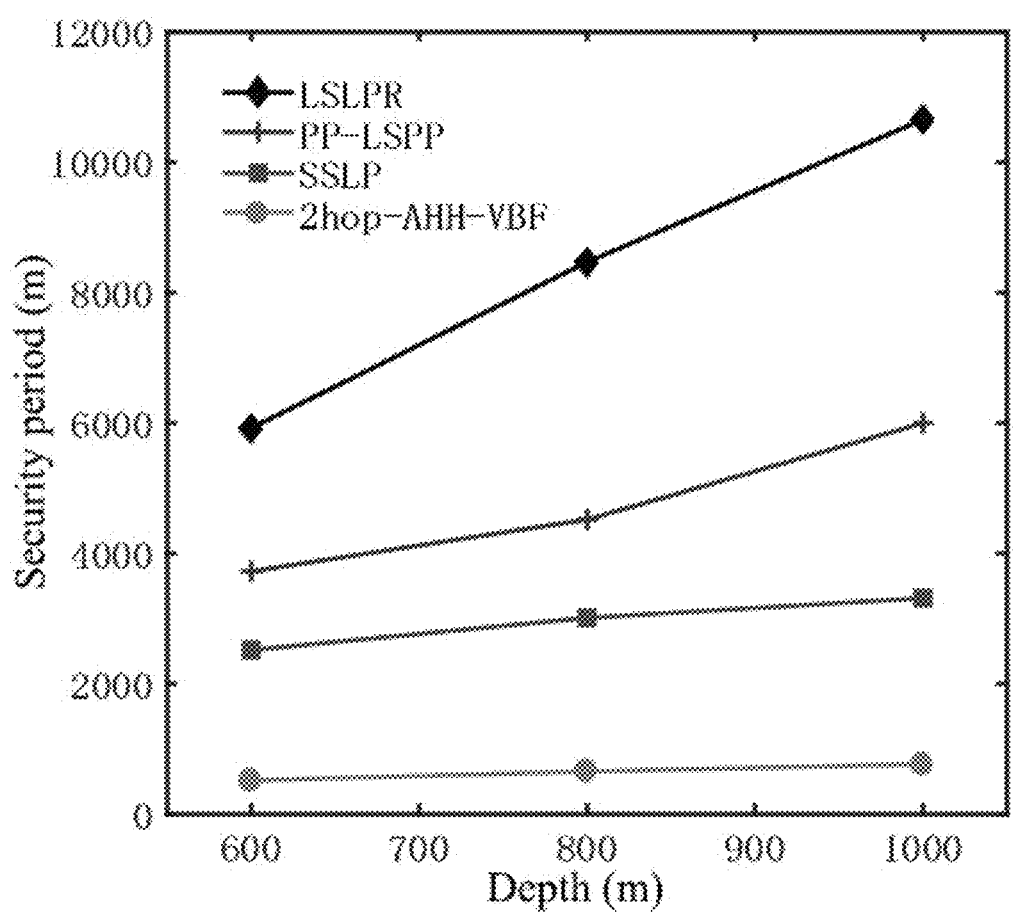
FIG. 9a is a relation diagram between the security period and the depth for LSLPR, PP-SLPP, SSLP, 2hop-AHH-VBF according to one embodiment of the present disclosure.
Figure 9B:
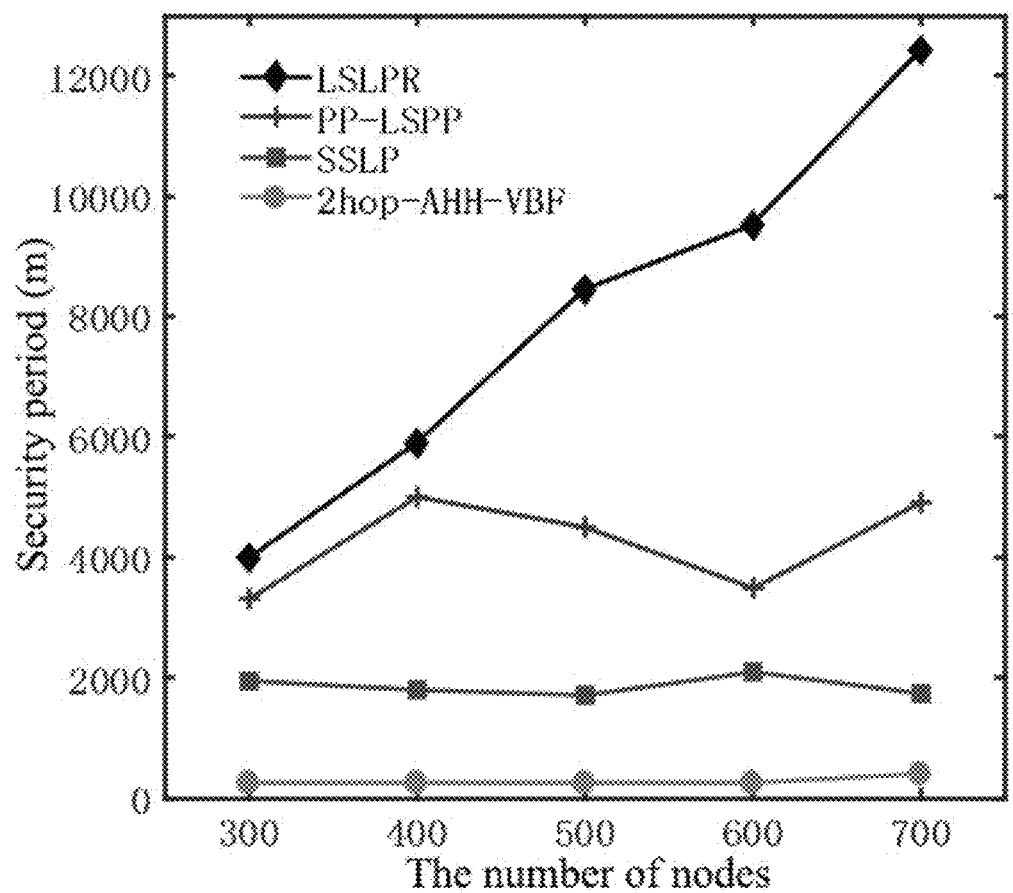
FIG. 9b is a relation diagram between the security period and number of nodes for LSLPR, PP-SLPP, SSLP, 2hop-AHH-VBF according to one embodiment of the present disclosure.
Figure 9C:
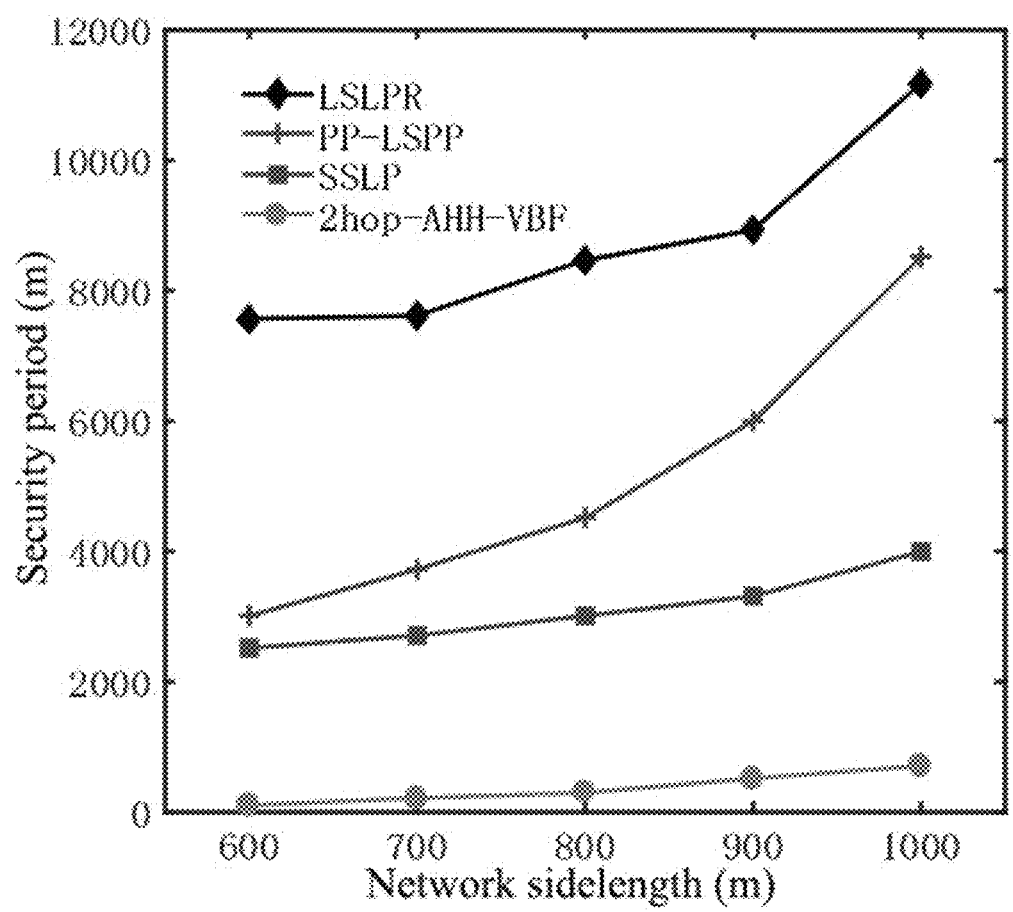
FIG. 9c is a relation diagram between the security period and a network sidelength for LSLPR, PP-SLPP, SSLP, 2hop-AHH-VBF according to one embodiment of the present disclosure.

FIG. 9a, FIG. 9b, and FIG. 9c show the comparison of security period of four schemes. PP-SLPP and SSLP protect SLP based on the movement of AUVs in UASNs. The larger the movement distance of AUVs, the longer the security period. However, the AUVs moves in a specific area. Even when the packets are transmitted using moving AUVs, the area through which the packets pass remains relatively homogeneous. Therefore, there are limitations to the protection of SLPs. As shown in FIG. 9a, FIG. 9b, and FIG. 9c, the security period of PP-SLPP is always higher than that of SSLP. In PP-SLPP, the multipath technique makes the adversary move a longer distance in finding the source location. Therefore, PP-SLPP has a larger security period than SSLP. In 2hop-AHH-VBF, packets are transmitted only in the pipe. The security period is the lowest among the four schemes because there is no protection measure for SLP. LSLPR uses proxy nodes and MPR-FP algorithm to make the routing paths randomly distributed in different areas of the network. Therefore, LSLPR has the largest security period among the four schemes in FIG. 9a, FIG. 9b, and FIG. 9c.

In FIG. 9a, the security period increases with depth. As the depth increases, the distance from the source node to the sink node becomes longer. This means that the adversary needs longer distance to find the source location, so the security period becomes longer. In FIG. 9b, because of the different number of push locations in each simulation experiment, the security period of PP-SLPP fluctuates with the number of nodes. In SSLP and 2hop-AHH-VBF, the security period is basically unchanged due to the fixed movement trajectory. As the number of nodes in LSLPR increases, the sending nodes have more options for the next hop. As a result, the routing paths are more diverse, and the security period increases. From FIG. 9c, the security period increases with the increase of Network sidelength. In the PP-SLPP scheme, the movement distance of AUVs increases with the Network sidelength, and thus, the security period increases. In SSLP and 2hop-AHH-VBF, the fixed movement trajectory makes the security period increase slowly. In LSLPR, the area where multiple paths are distributed increases with the Network sidelength, hence, the security period increases.

C. Delay

Figure 10A:
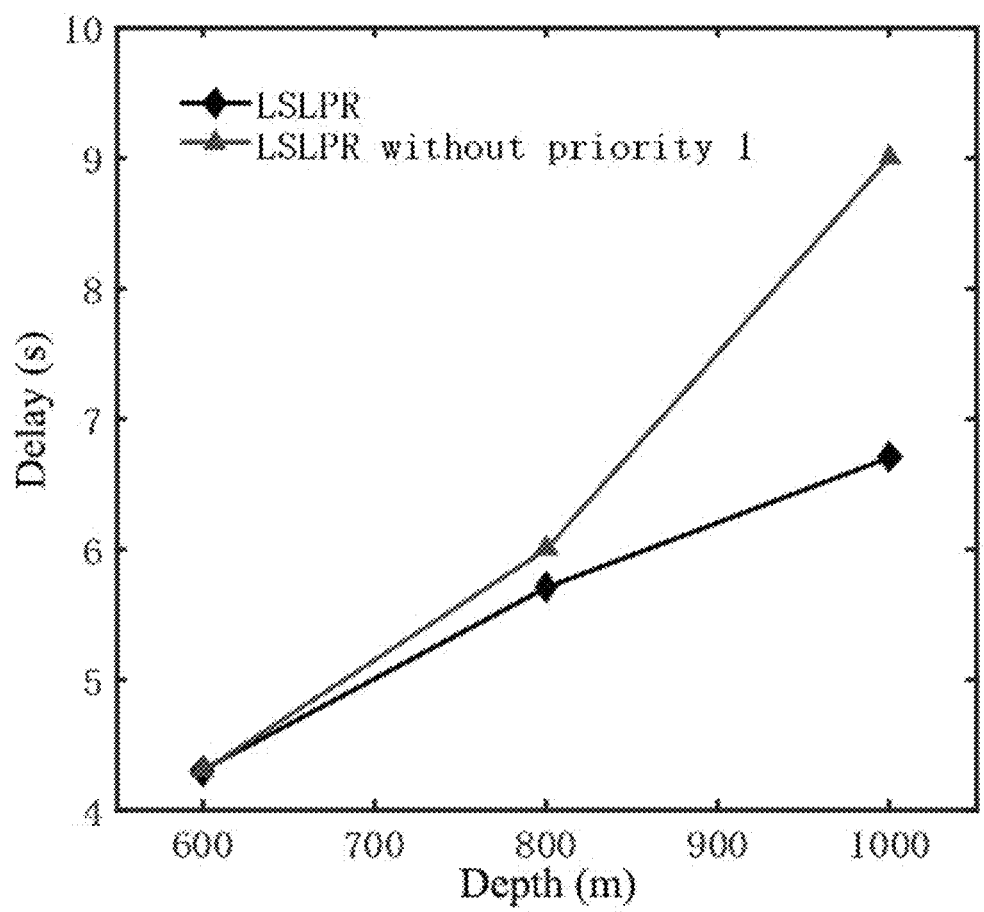
FIG. 10a is a relation diagram between delay and depth for LSLPR and LSLPR without priority 1 according to one embodiment of the present disclosure.
Figure 10B:
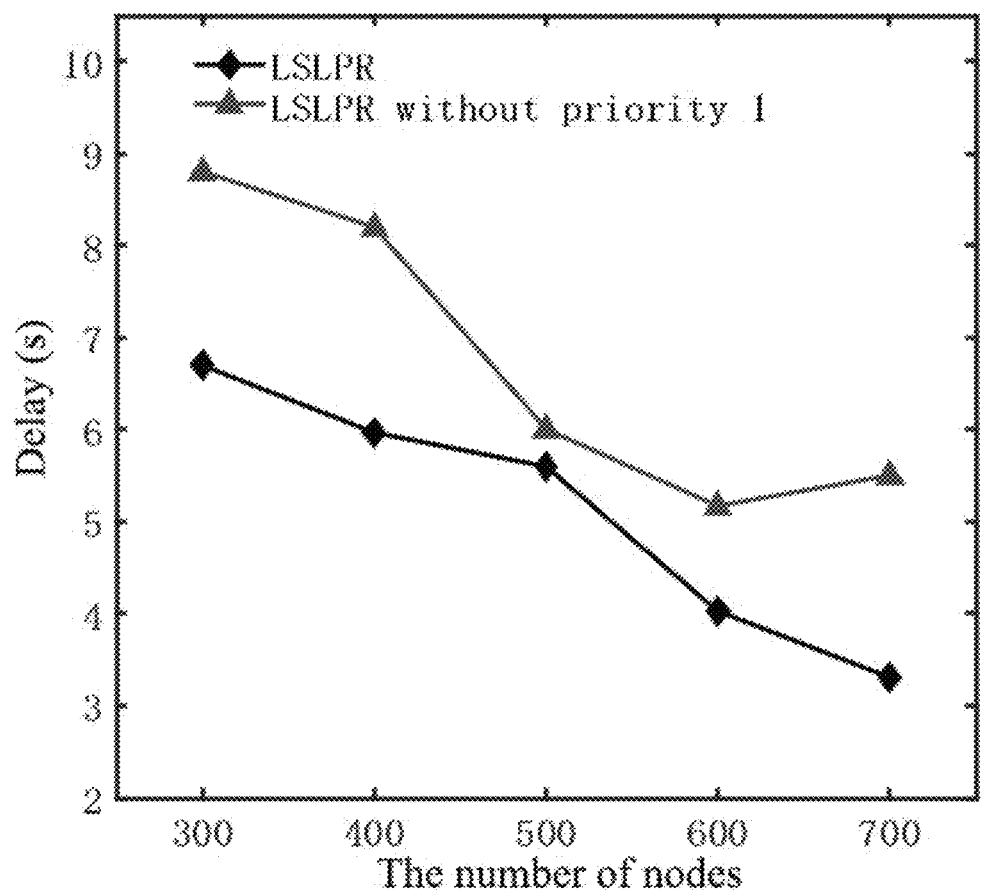
FIG. 10b is a relation diagram between the delay and the number of nodes for LSLPR and LSLPR without priority 1 according to one embodiment of the present disclosure.

In LSLPR, the shorter the path from source node to sink node, the smaller the delay. Priority 1 is added in LSLPR protocol to avoid packets from moving away from the proxy area. Thus, priority 1 alleviates the long detour problem and reduces the delay. FIG. 10a and FIG. 10b show the comparison of LSLPR with priority 1 and LSLPR without priority 1. In FIG. 10a and FIG. 10b, the delay of LSLPR is lower than that of LSLPR without setting priority 1. The effectiveness of priority 1 in mitigating the long detour problem is verified. In FIG. 10a, the delay of LSLPR and LSLPR without setting priority 1 increases with depth. The depth determines the distance from the source node to the sink node. Therefore, the delay increases with depth. From FIG. 10b, it can be seen that the delay of LSLPR and LSLPR without setting priority 1 decreases as the number of nodes increases. Due to the increase in the number of nodes, the sending node has a better choice of the next hop, which results in fewer hops from the source node to the sink node and less delay.

Figure 11A:
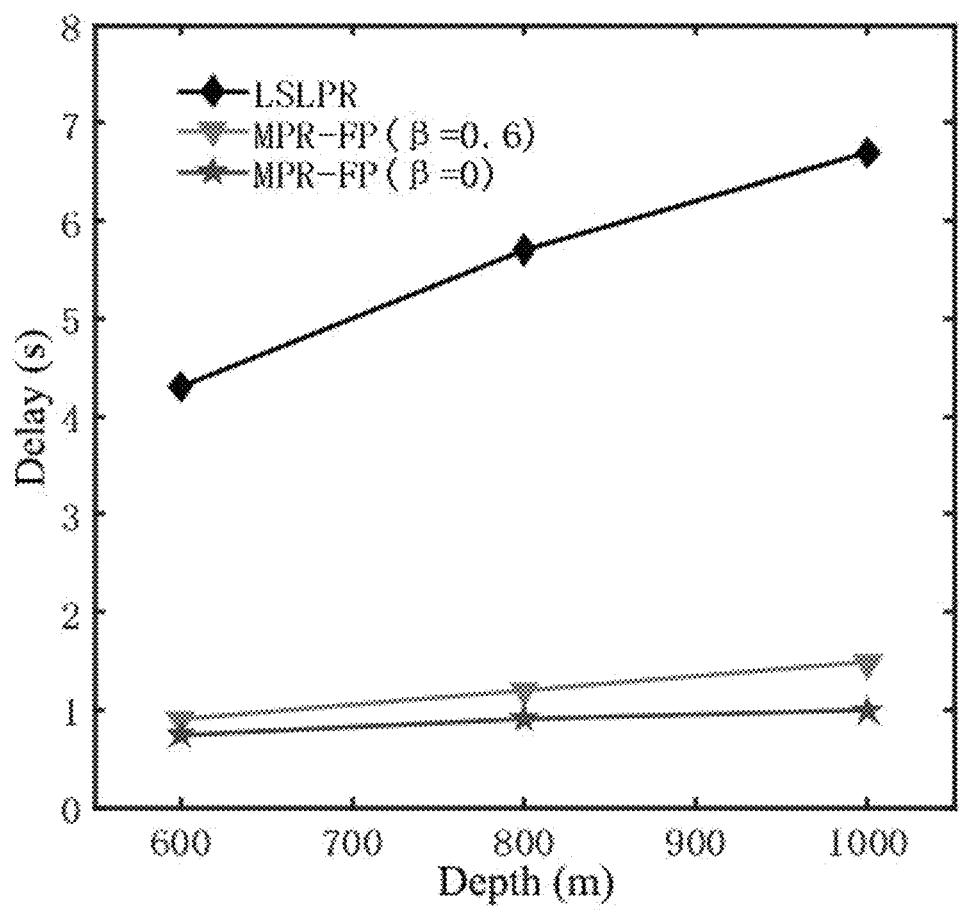
FIG. 11a is a relation diagram between the delay and the depth for MPR-FP ($\beta$=0), MPR-FP ($\beta$=0.6), and LSLPR according to one embodiment of the present disclosure.
Figure 11B:
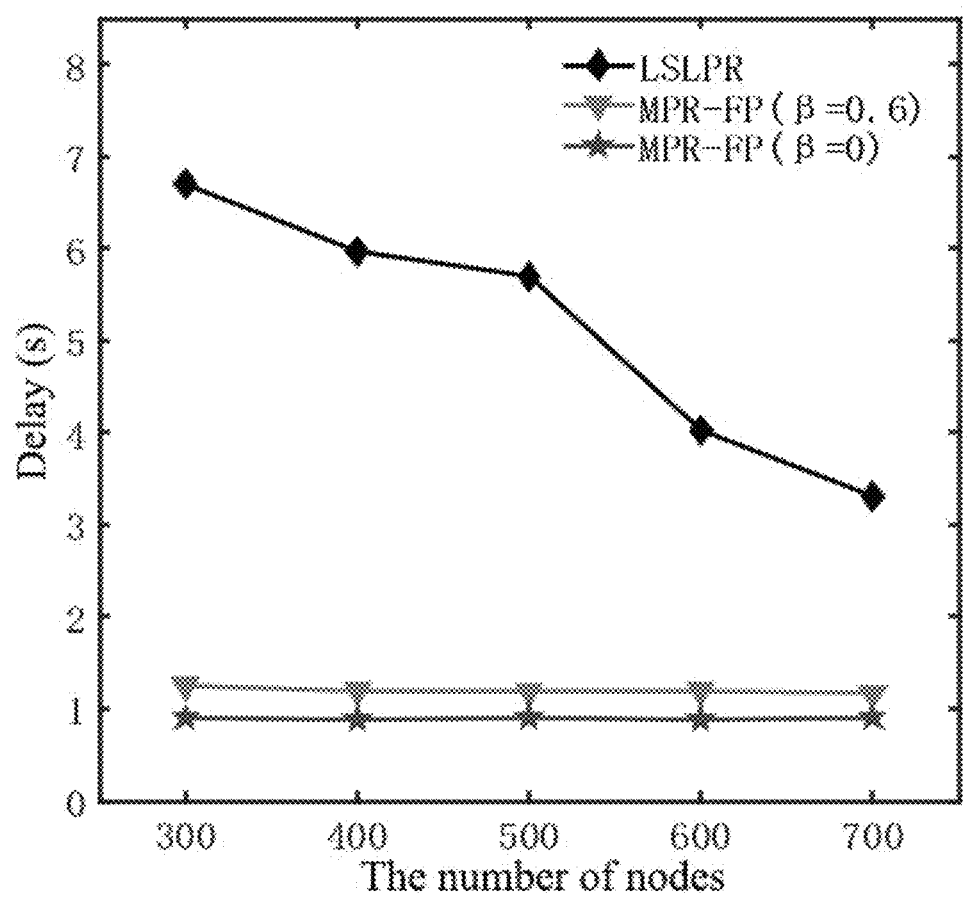
FIG. 11b is a relation diagram between the delay and the number of nodes for MPR-FP ($\beta$=0), MPR-FP ($\beta$=0.6), and LSLPR according to one embodiment of the present disclosure.

FIGS. 11a and 11b show the delay comparison of MPR-FP ($\beta=0$), MPR-FP ($\beta=0.6$), LSLPR. MPR-FP ($\beta=0$) has the lowest delay. The reason is that different packets do not reach the sink node through multiple paths. Specifically, there is only one routing path from the source node to the sink node, so the delay is minimal. In MPR-FP ($\beta=0.6$), the residual energy has a greater impact on the forwarding probability, making the routing path more diverse. However, the routing paths are not distributed throughout the network, so the delay is greater than that of MPR-FP ($\beta=0$) and less than that of LSLPR. In LSLPR, the diversity of routing paths and the random selection of proxy nodes make the packets reach the sink node through different paths distributed in different regions. Therefore, LSLPR has the highest delay due to detour from source node to sink node. In FIG. 11a, the delay increases with depth. As can be seen in FIG. 11b, the delay of LSLPR decreases as the number of nodes increases. Moreover, as shown in FIG. 11a and FIG. 11b, the number of nodes has little effect on MPR-FP ($\beta=0$) and MPR-FP ($\beta=0.6$). Because MPR-FP ($\beta=0$) and MPR-FP ($\beta=0.6$) do not detour to the sink, the routing path is shorter. As the number of nodes increases, the sending node has a better choice of the next hop. For shorter routing paths, the number of hops is not affected, and the delay fluctuates less.

Figure 12A:
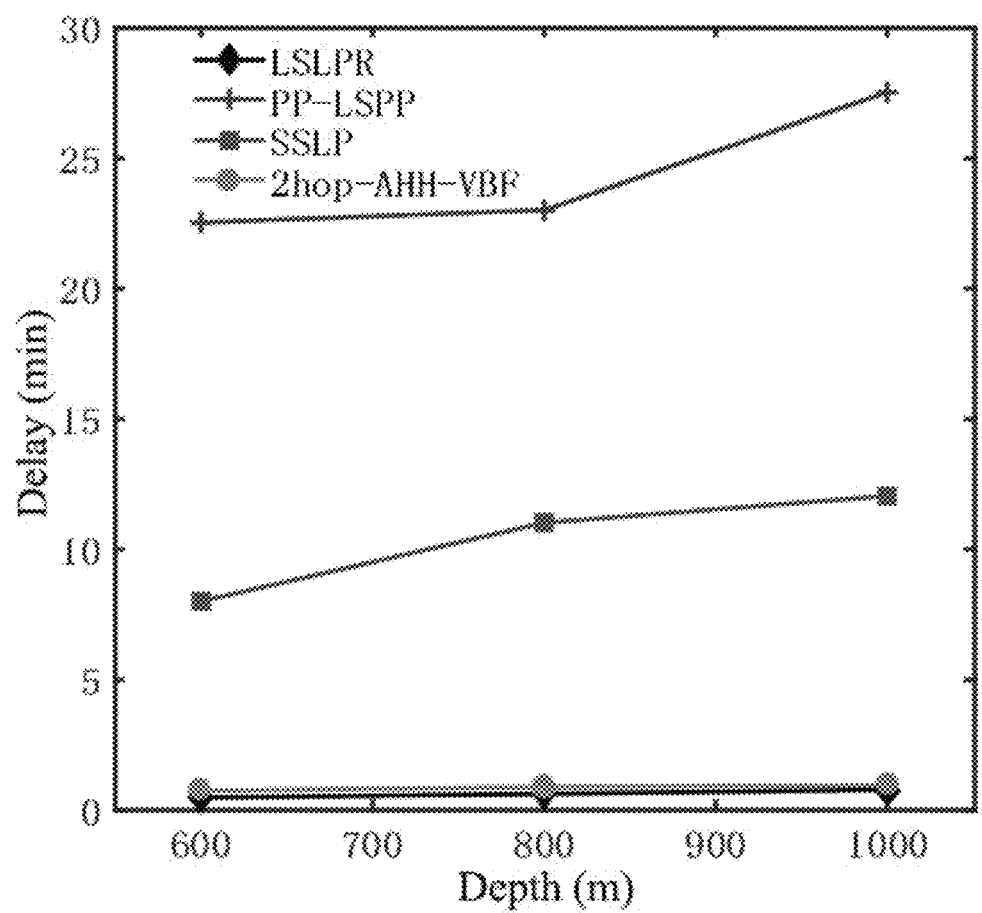
FIG. 12a is a relation diagram between the delay and the depth for LSLPR, PP-SLPP, SSLP, 2hop-AHH-VBF according to one embodiment of the present disclosure.
Figure 12B:
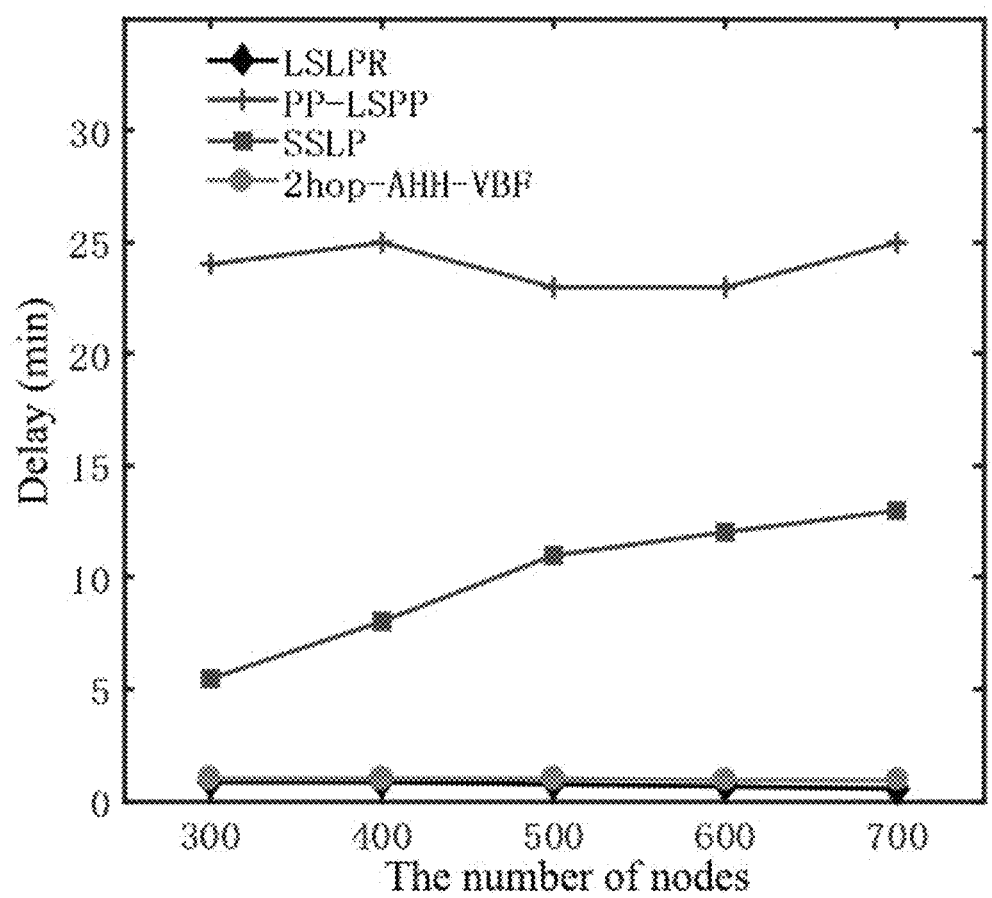
FIG. 12b is a relation diagram between the delay and the number of nodes for LSLPR, PP-SLPP, SSLP, 2hop-AHH-VBF according to one embodiment of the present disclosure.
Figure 12C:
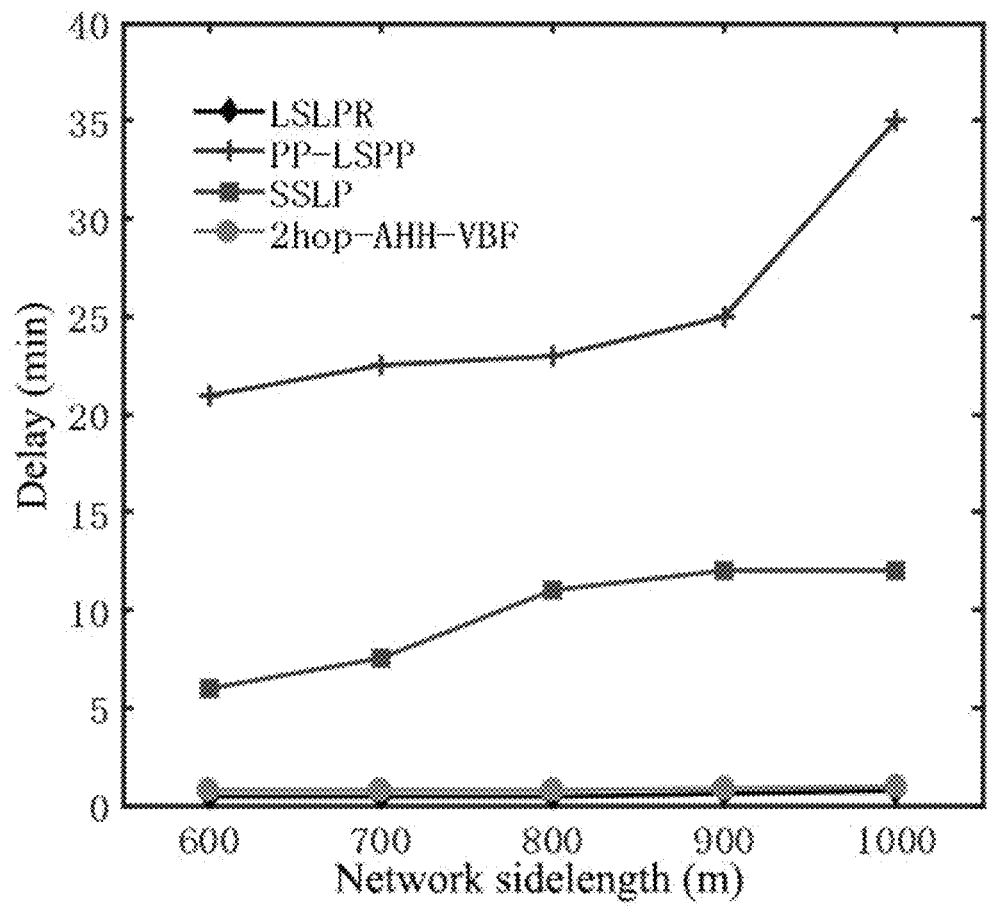
FIG. 12c is a relation diagram between the delay and the network sidelength for LSLPR, PP-SLPP, SSLP, 2hop-AHH-VBF according to one embodiment of the present disclosure.

As shown in FIGS. 12a, 12b and 12c, the delay of PP-SLPP and SSLP is much larger than that of LSLPR and 2hop-AHH-VBF. Due to the use of AUVs in PP-SLPP and SSLP, the delay of PP-SLPP and SSLP is greater compared to pure routing protocols such as LSLPR and 2hop-AHH-VBF. The unit of delay for PP-SLPP and SSLP is in minutes, and the unit of delay for LSLPR and 2hop-AHH-VBF is in seconds. More specifically, the delay of PP-SLPP is larger than that of SSLP because the delay of PP-SLPP is the total time for the master AUV to collect data from all slave AUVs. Unlike PP-SLPP, in SSLP, the AUVs collect data according to the trajectory, and therefore do not need to wait for too long. As can be seen from FIG. 11a and FIG. 11b, the delay of LSLPR is much larger than that of MPR-FP. However, in FIG. 12a, FIG. 12b, and FIG. 12c, the delay of LSLPR and 2hop-AHH-VBF are similar. The reason is that the hold time of 2hop-AHH-VBF leads to longer delay. Both 2hop-AHH-VBF and LSLPR sacrifice delay for their own purposes. Compared to PP-SLPP and SSLP, 2hop-AHH-VBF and LSLPR sacrifice very little in terms of delay.

In FIGS. 12a and 12c, the delay increases with depth or Network sidelength. In FIG. 12b, the fluctuation of PP-SLPP is caused by the difference between the push position of the cluster of AUVs and the random initial position. In SSLP, the delay increases with the number of nodes. The reason is that the number of data nodes collected by the AUVs on the fixed movement trajectory becomes more. In 2hop-AHH-VBF, the increase in the number of nodes has little effect on the delay as the packets are transmitted in the pipe. Therefore, the delay remains constant as the number of nodes increases. In LSLPR protocol, as the number of nodes increases, the sending node can choose a better next hop, and the number of hops from the source node to the sink node becomes smaller. Therefore, as the number of nodes increases, the delay has a tendency to decrease.

Figure 13A:
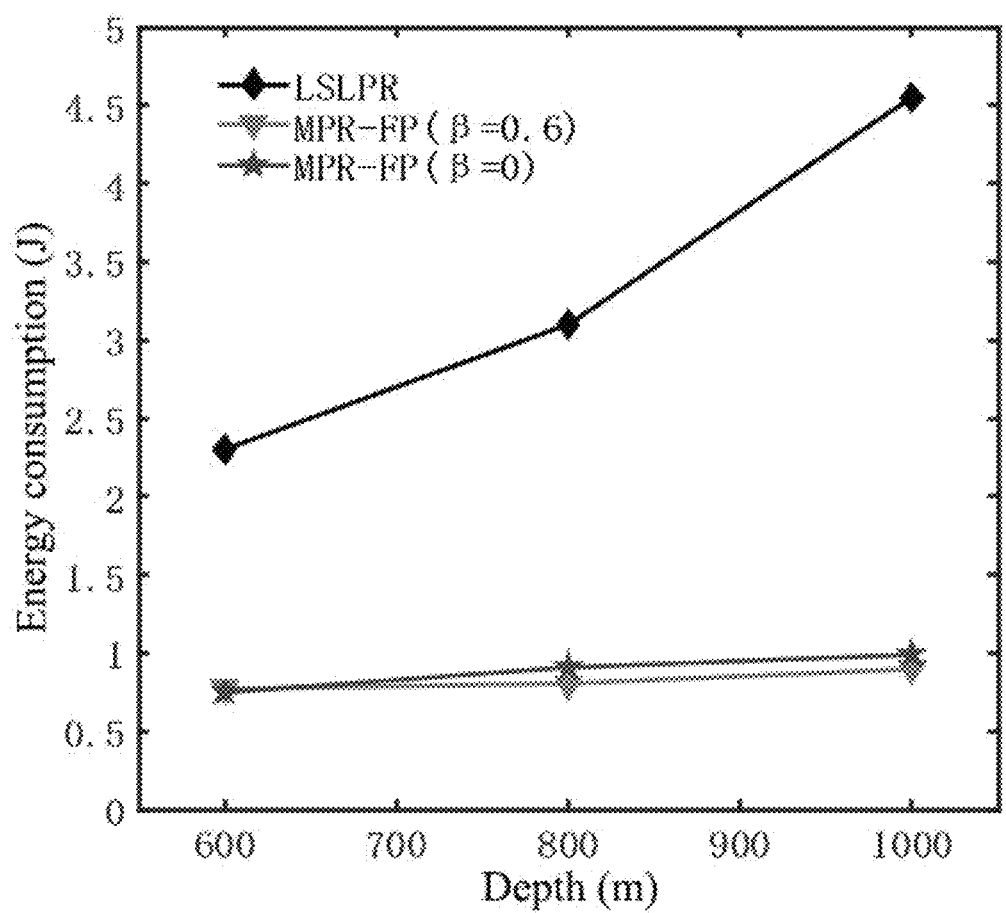
FIG. 13a is a relation diagram between an energy consumption and the depth for MPR-FP ($\beta$=0), MPR-FP ($\beta$=0.6) and LSLPR according to one embodiment of the present disclosure.
Figure 13B:
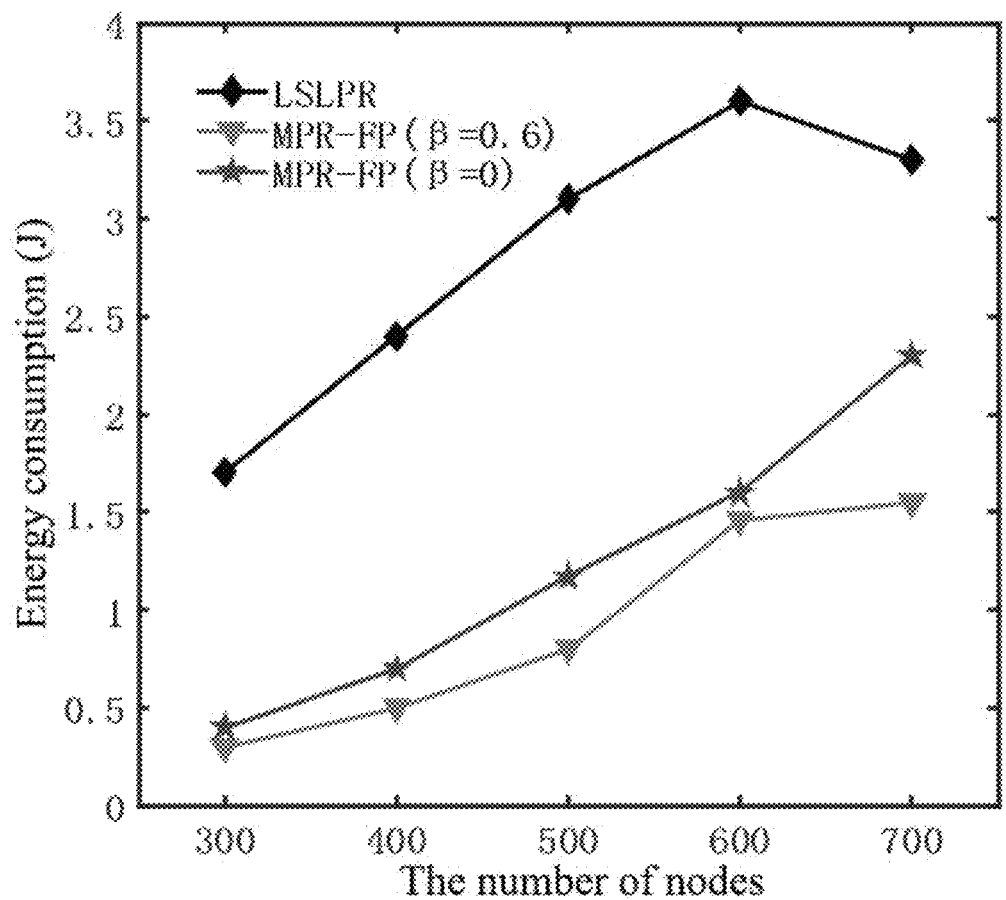
FIG. 13b is a relation diagram between the energy consumption and the number of nodes for MPR-FP ($\beta$=0), MPR-FP ($\beta$=0.6) and LSLPR according to one embodiment of the present disclosure.

FIGS. 13a and 13b show the comparison of the energy consumption of MPR-FP ($\beta=0$), MPR-FP ($\beta=0.6$) and LSLPR. The routing paths of LSLPR are distributed in various regions of the network, which results in the highest energy consumption of LSLPR among the three schemes. In FIG. 13a and FIG. 13b, the energy consumption of MPR-FP ($\beta=0$) is slightly larger than that of MPR-FP ($\beta=0.6$). MPR-FP ($\beta=0$) creates a unique routing path by selecting the next hop with the highest density of nodes, which may have worse energy consumption. However, there are some paths that consume less energy among multiple paths, hence, MPR-FP ($\beta=0.6$) consumes less energy.

Figure 14A:
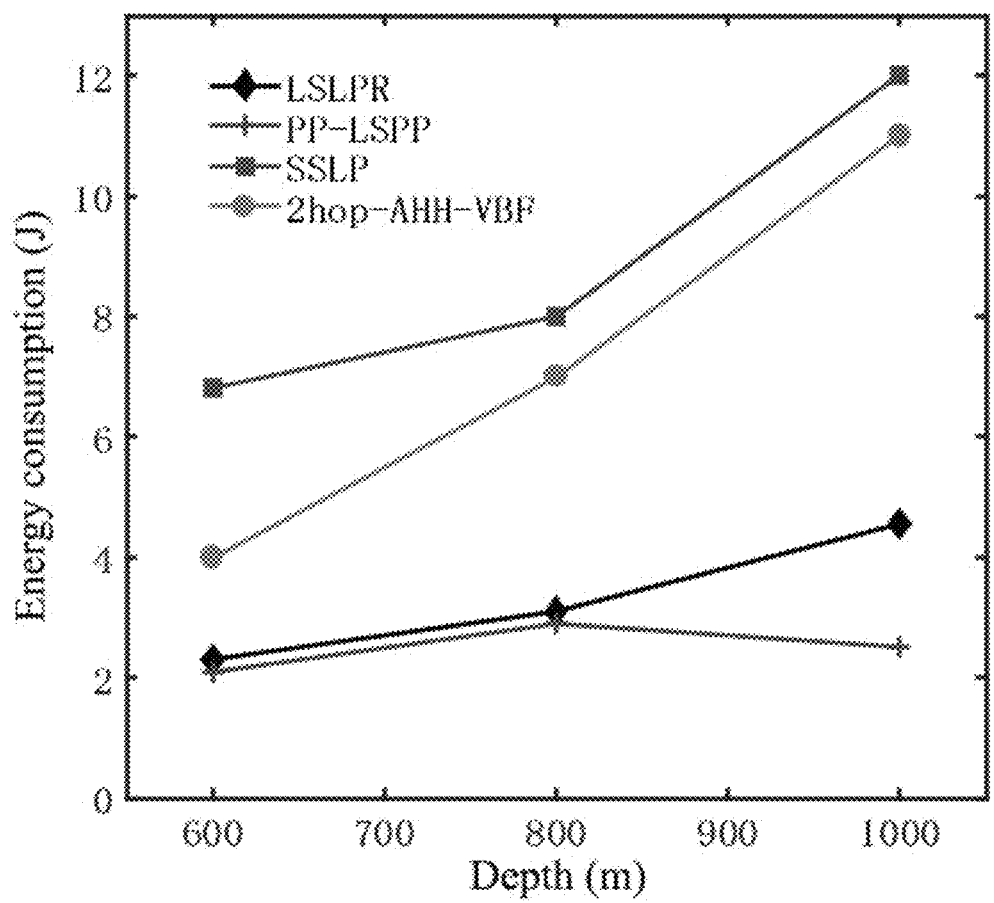
FIG. 14a is a relation diagram between the energy consumption and the depth for LSLPR, PP-SLPP, SSLP, 2hop-AHH-VBF according to one embodiment of the present disclosure.
Figure 14B:
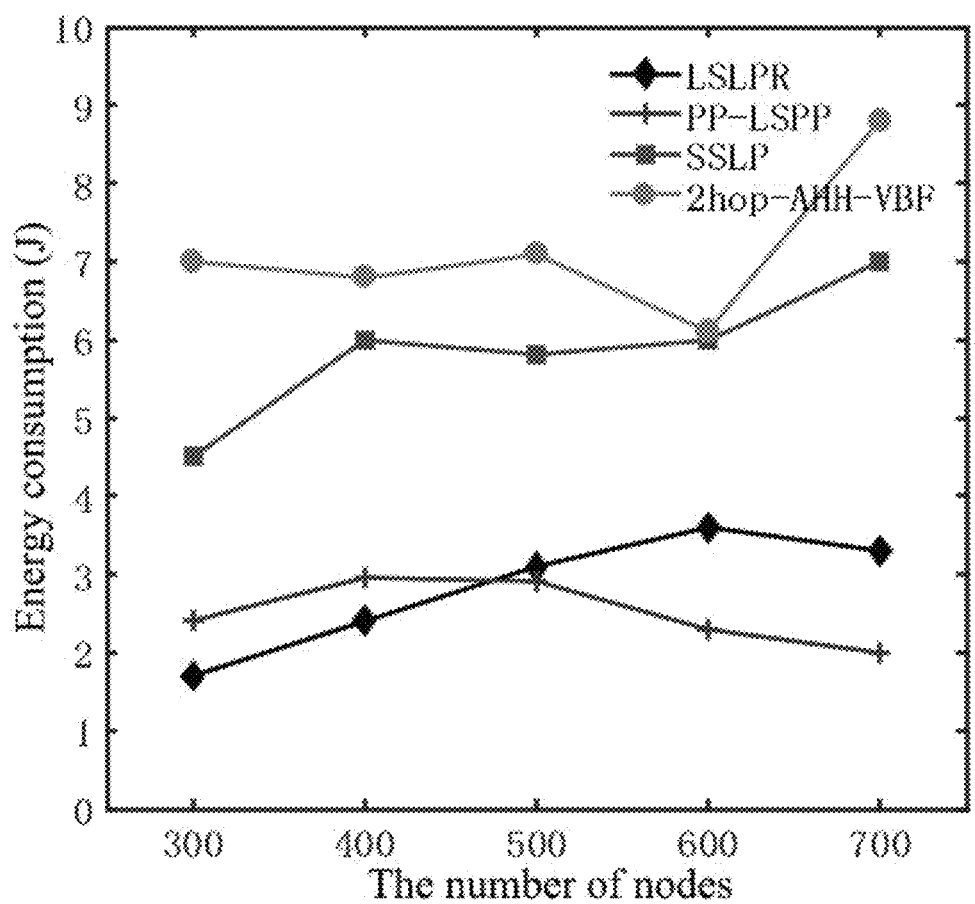
FIG. 14b is a relation diagram between the energy consumption and the number of nodes for LSLPR, PP-SLPP, SSLP, 2hop-AHH-VBF according to one embodiment of the present disclosure.
Figure 14C:
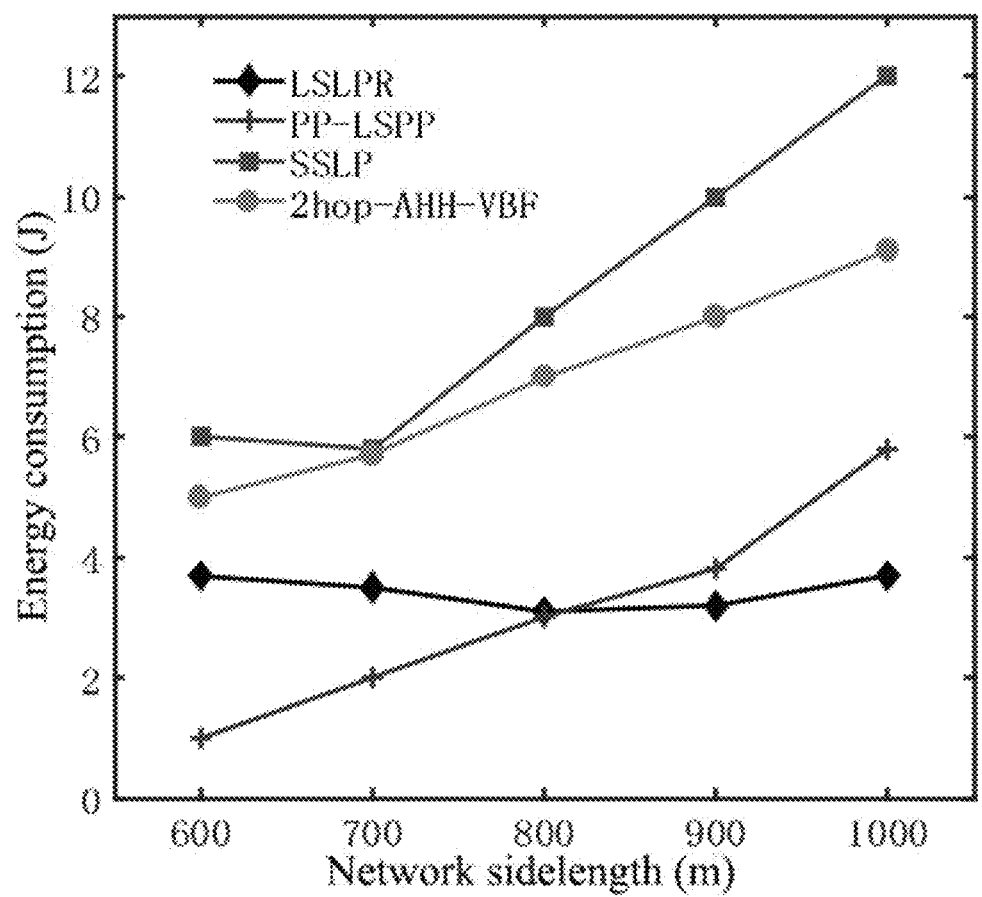
FIG. 14c is a relation diagram between the energy consumption and the network sidelength for LSLPR, PP-SLPP, SSLP, 2hop-AHH-VBF according to one embodiment of the present disclosure.

FIGS. 14a-14c show the general trend of the energy consumption change of the four schemes. The energy consumption of PP-SLPP and SSLP includes the energy consumption of all nodes and all AUVs in the network. Although the energy consumption of AUVs is large, AUVs are generally considered to have infinite energy. Therefore, the energy consumption in this disclosure refers to the total energy consumed by all hard-to-charge underwater sensor nodes. As shown in FIGS. 14a-14c, the energy consumption of PP-SLPP is less than that of SSLP. In SSLP, both AUVs and nodes are involved in data transmission. However, in PP-SLPP, the nodes just push the position information to the master AUVs using the VBF routing protocol. Therefore, compared to the PP-SLPP scheme, the nodes in the SSLP scheme need to send more packets. In addition, the energy consumption of LSLPR is lower than that of 2hop-AHH-VBF. In 2hop-AHH-VBF, although only nodes in the pipe can participate in data forwarding, it is essentially a broadcast routing protocol. The energy consumption of 2hop-AHH-VBF is inevitably greater than that of a unicast routing protocol like LSLPR. In FIGS. 14a and 14c, the energy consumption increases with the depth or the network sidelength. This is because the length of the routing path becomes longer as the network depth or network sidelength increases. In FIG. 14b, except the PP-SLPP, the energy consumption in other three schemes increase with the increase in the number of nodes. In PP-SLPP, AUVs do not go to all clusters to collect data even if the number of nodes increases, which leads to fluctuations in PP-SLPP.

5. Summary and Future Work

Location privacy protection is crucial for UASNs. The LSLPR protocol incorporates the SLP algorithm into the routing protocol for UASNs. The protocol improves the methods of protecting SLP such as multipath techniques and proxy node selection in WSNs and makes these methods applicable to UASNs. At the same time, a new MPR-FP algorithm is proposed which calculates the forwarding probability using the node residual energy and the node density to select the best next hop. MPR-FP algorithm implements multipath routing. Proxy nodes enable multiple paths to be distributed throughout the network rather than in the single region. The MPR-FP algorithm and proxy nodes enhance SLP by increasing the search range of the adversary. Simulation results show that compared to the existing routing protocols for UASNs and SLP schemes, the LSLPR protocol has less energy consumption and delay and longer security period.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A routing protocol method for underwater acoustic sensor networks (UASNs) based on layering and source location privacy (LSLP) s, comprising:
    selecting randomly a proxy area by a source node;
    delivering a packet from the source node to the proxy area through a forwarding probability-based multipath routing algorithm; and giving a layer-based priority to candidate neighbor nodes to alleviate a long detour problem;
    selecting randomly a proxy node in the proxy area;
    delivering the packet from the proxy node to a sink node through the forwarding probability-based multipath routing algorithm; and
    repeating the previous steps;
    wherein the step of selecting randomly the proxy node comprises:
    (a) establishing a three-dimensional (3D) coordinate system with the sink node as a center node; making position information of the sink node public across a network; and dividing a 3D underwater space into four quadrants based on the 3D coordinate system;
    (b) converting position information of an underwater node into a 3D coordinate centered on the sink node during a network initialization process;
    (c) assuming that a layer of the source node is $L_s$, such that a layer of the proxy area is expressed as:

$L_p=\text{INT}(L_s/2);$ wherein $L_p$ is the layer of the proxy area; and the proxy area contains all nodes in the layer $L_p$;
    (d) dividing the proxy area into a first subarea, a second subarea, a third subarea, and a fourth subarea by the 3D coordinate system;
    wherein if the source node is in one of the four quadrants, proxy areas in the other three of the four quadrants become candidate proxy areas; and a random number Q is set in a range from 0 to 3, and a target proxy area is selected according to a value of the random number Q; and
    (e) after the packet is delivered from the source node to a first node in the target proxy area, randomly selecting the number of hops of the packet in the proxy area based on the random number Q, wherein a node reached by a last hop is the proxy node.

2. The routing protocol method of claim 1, wherein the forwarding probability-based multipath routing algorithm is performed through steps of:
    selecting, by a sending node, neighbor nodes whose layers are not greater than a layer of the sending node as the candidate neighbor nodes; and
    selecting, by the sending node, a best next hop by calculating a forwarding probability of the candidate neighbor nodes; wherein the forwarding probability depends on a node density and a residual energy of the candidate neighbor node;
    a forwarding probability $P(i,j)$ of a candidate neighbor node j of a sending node i is expressed as:

$P(i,j)=\alpha e(j)+\beta d(j);$ wherein $\alpha$ and $\beta$ are weight coefficients, and $\alpha+\beta=1$; $d(j)$ represents a node density of the candidate neighbor node j; $e(j)$ represents a ratio of a residual energy $E_R(j)$ of the candidate neighbor node j to an initial energy $E_{init}$ of the candidate neighbor node j, and is expressed as:

$$e(j) = \frac{E_R(j)}{E_{init}};$$

the node density of the candidate neighbor node j is expressed as:

$$d(j) = \frac{|Nc(j)|}{\sum_{x=0}^{|Nc(i)|} |Nc(x)|};$$

wherein $Nc(j)$ represents a set of candidate nodes of the candidate node j; $|Nc(j)|$ represents the number of the candidate nodes of the candidate node j; and $$\sum_{x=0}^{|Nc(i)|} |Nc(x)|$$

represents the number of candidate neighbor nodes of all candidate neighbor nodes of the sending node i.

3. The routing protocol method of claim 1, further comprising:
    screening a candidate neighbor node of a sending node that is close to the proxy area through the following steps:
    (A) setting a coordinate of a sending node A as $(x_s, y_s, z_s)$; selecting a coordinate of a sphere center O as $(a,b,c)$; wherein the sphere center O is a coordinate point of the sending node A closest to a quadrant in which the proxy area is located;
    (B) calculating a sphere radius R; wherein the sphere radius R is a maximum of a distance $R_{min}$ and a communication radius $R_c$; and the distance $R_{min}$ represents a distance between the sending node A and the sphere center O, expressed as:

$R_{min}=\text{sqrt}((a-x_s)^2+(b-y_s)^2+(c-z_s)^2);$ the sphere radius R is expressed as:

$R=\max(R_{min}, R_c);$ (C) screening the candidate neighbor node close to the proxy area; assuming that a set of the candidate neighbor node close to the proxy area is V, the sending node A has i candidate neighbor nodes, and coordinates of the i candidate neighbor nodes are expressed as $(x_i, y_i, z_i)$; wherein a node whose distance from the sphere center O is less than or equal to the sphere radius R is the candidate neighbor node of the sending node A close to the proxy area; and the set V is expressed as:

$V=\{(x_i,y_i,z_i)|\text{sqrt}((a-x_i)^2+(b-y_i)^2+(c-z_i)^2)<=R\}$.

4. The routing protocol method of claim 3, wherein the layer-based priority comprises:
   Priority 1: the sending node preferentially selects the candidate neighbor node that is close to the proxy area; and
   Priority 2: compared to a layer of the sending node, the candidate neighbor node with a smaller layer is preferentially selected;
   wherein the sending node first selects candidate neighbor nodes that satisfy the priority 1, finds candidate neighbor nodes that satisfy the priority 2 from the candidate neighbor nodes that satisfy the priority 1, and selects a node with the highest forwarding probability from the candidate neighbor nodes that satisfy both the priority 1 and the priority 2 as a best next hop according to the forwarding probability-based multipath routing algorithm.

* * * * *